(12) United States Patent
Haidar et al.

(10) Patent No.: US 11,663,483 B2
(45) Date of Patent: May 30, 2023

(54) LATENT SPACE AND TEXT-BASED GENERATIVE ADVERSARIAL NETWORKS (LATEXT-GANS) FOR TEXT GENERATION

(71) Applicant: Huawei Technologies Co., Ltd., Shenzhen (CN)

(72) Inventors: Md Akmal Haidar, Montreal (CA); Mehdi Rezagholizadeh, Montreal (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 666 days.

(21) Appl. No.: 16/175,373

(22) Filed: Oct. 30, 2018

(65) Prior Publication Data

US 2020/0134463 A1    Apr. 30, 2020

(51) Int. Cl.
G06N 3/084    (2023.01)
G06N 3/047    (2023.01)
G06F 40/20    (2020.01)
G06N 3/045    (2023.01)

(52) U.S. Cl.
CPC ............ *G06N 3/084* (2013.01); *G06F 40/20* (2020.01); *G06N 3/045* (2023.01); *G06N 3/047* (2023.01)

(58) Field of Classification Search
CPC .......... G06N 3/0454; G06N 3/00; G06N 5/00; G06N 7/00; G06N 10/00; G06N 20/00; G06N 99/00
See application file for complete search history.

(56) References Cited

U.S. PATENT DOCUMENTS 10,152,970 B1 * 12/2018 Olabiyi ................. G10L 13/027
11,106,903 B1    8/2021 Huynh et al.
2018/0082150 A1    3/2018 Itou et al.
(Continued)

FOREIGN PATENT DOCUMENTS

CN    107832353 A    3/2018

OTHER PUBLICATIONS

Graham Spinks and Marie-Francine Moens (2018). Generating Continuous Representations of Medical Texts. CoRR, abs/1805. 05691. (Year: 2018).*

(Continued)

*Primary Examiner* — Kakali Chaki
*Assistant Examiner* — Johnathan R Germick
(74) *Attorney, Agent, or Firm* — Slater Matsil, LLP

(57) ABSTRACT

According to embodiments, an encoder neural network receives a one-hot representation of a real text. The encoder neural network outputs a latent representation of the real text. A decoder neural network receives random noise data or artificial code generated by a generator neural network from random noise data. The decoder neural network outputs softmax representation of artificial text. The decoder neural network receives the latent representation of the real text. The decoder neural network outputs a reconstructed softmax representation of the real text. A hybrid discriminator neural network receives a first combination of the soft-text and the latent representation of the real text and a second combination of the softmax representation of artificial text and the artificial code. The hybrid discriminator neural network outputs a probability indicating whether the second combination is similar to the first combination. Additional embodiments for utilizing latent representation are also disclosed.

22 Claims, 6 Drawing Sheets

(56) References Cited

U.S. PATENT DOCUMENTS

| | | |
|---|---|---|
| 2018/0176578 A1 | 6/2018 | Rippel et al. |
| 2018/0314716 A1 | 11/2018 | Kim et al. |
| 2019/0130221 A1 | 5/2019 | Bose et al. |
| 2019/0236148 A1 | 8/2019 | DeFelice |
| 2020/0034432 A1 | 1/2020 | Jain et al. |

OTHER PUBLICATIONS

Alireza Makhzani and Jonathon Shlens and Navdeep Jaitly and Ian J. Goodfellow (2015). Adversarial Autoencoders. CoRR, abs/1511.05644. (Year: 2015).*

Matt J. Kusner, & José Miguel Hernández-Lobato. (2016). GANS for Sequences or Discrete Elements with the Gumbel-softmax Distribution. (Year: 2016).*

Wang, J., Zhou, W., Tang, J., Fu, Z., Tian, Q., & Li, H. (2018). Unregularized Auto-Encoder with Generative Adversarial Networks for Image Generation. In Proceedings of the 26th ACM International Conference on Multimedia (pp. 709-717). Association for Computing Machinery. (Year: 2018).*

Wang, A. (2016). Generative Image Modeling Using Style and Structure Adversarial Networks. In Computer Vision—ECCV 2016 (pp. 318-335). Springer International Publishing (Year: 2016).*

Yizhe Zhang, Zhe Gan, Kai Fan, Zhi Chen, Ricardo Henao, Dinghan Shen, & Lawrence Carin. (2017). Adversarial Feature Matching for Text Generation. (Year: 2017).*

Ishaan Gulrajani and Faruk Ahmed and Mart\'\in Arjovsky and Vincent Dumoulin and Aaron C. Courville (2017). Improved Training of Wasserstein GANs. CoRR, abs/1704.00028. (Year: 2017).*

M. A. El Affendi and K. H. S. Al Rajhi, "Text encoding for deep learning neural networks: A reversible base 64 (Tetrasexagesimal) Integer Transformation (RIT64) alternative to one hot encoding with applications to Arabic morphology," 2018 Sixth International Conference on Digital Information, (Year: 2018) Networking, and Wireless Communications (DINWC), 2018, pp. 70-74, doi: 10.1109/DINWC.2018.8356998. (Year: 2018).*

S. Achanta, A. Pandey and S. V. Gangashetty, "Analysis of sequence to sequence neural networks on grapheme to phoneme conversion task," 2016 International Joint Conference on Neural Networks (IJCNN), 2016, pp. 2798-2804, doi: 10.1109/IJCNN.2016.7727552. (Year: 2016).*

Haidar, MD., A., et al., "Latent Code and Text-based Generative Adversarial Networks for Soft-text Generation", Proceedings of NAACL-HLT, Jun. 2-Jun. 7, 2019, 11 Pages, Minneapolis, Minnesota.

Bahdanau., D., et al., "Neural Machine Translation by Jointly Learning to Align and Translate", arXiv Preprint arXiv:1409.0473 [cs.CL], V.7, May 19, 2016, 15 Pages.

Bengio, Y., et al., "Curriculum Learning", Proceedings of the 26th Annual International Conference on Machine Learning, Jun. 2009, 8 Pages.

Bowman, S., et al., "Generating Sentences from a Continuous Space", arXiv Preprint, arXiv: 1511.06349 [cs.LG], V.1, May 12, 2016, 12 Pages.

Che, T., et al., "Maximum-Likelihood Augmented Discrete Generative Adversarial Networks", arXiv Preprint arXiv:1702.07983 [cs.AI], V.1, Feb. 26, 2017, 11 Pages.

Cifka, O., et al., "Eval All, Trust a Few, Do Wrong to None: Comparing Sentence Generation Models", arXiv Preprint arXiv:1804.07972 [cs.CL], V.2 Oct. 30, 2018, 12 Pages.

Dumoulin, V., et al., "Adversarially Learned Inference", arXiv Preprint arXiv: 1606.00704 [stat.ML], V.3, Feb. 21, 2017, 18 Pages.

Fedus, W., et al., "MaskGan: Better Text Generation via Filing in the .", arXiv Preprint arXIV: 1801.07736 [stat.ML], V.3, Mar. 1, 2018, 17 Pages.

Goodfellow, I., et al., "Generative Adversarial Nets", Neural Information Processing Systems, 2014, 9 Pages. Montreal, QC.

Gulrajani, I., et al., "Improved Training of Wasserstein GANs", arXiv:1704.00028 [cs.LG], V.3, Dec. 25, 2017, 20 Pages.

Guo, J., et al., "Long Text Generation via Adversarial Training with Leaked Information", arXiv Preprint arXiv: 1709.08624 [cs.CL], V.2, Dec. 8, 2017, 14 Pages.

Hochreiter., S., et al., "Long Short-Term Memory", Neural Computation, 9 (8): 1735-1780, Dec. 1997, 32 Pages.

Hu, Z., et al., "Toward Controlled Generation of Text", arXiv Preprint arXiv: 1703.00955 [cs.LG],V.4, Sep. 13, 2018, 10 Pages.

Huszar, F., et al., "How (Not) to Train Your Generative Model: Scheduled Sampling, Likelihood, Adversary?", arXiv Preprint arXiv: 1511.05101 [stat.ML], V.1 Nov. 16, 2015, 9 Pages.

Kingma, D., et al., "Auto-Encoding Variational Bayes", arXvi Preprint arXvi:1312.6114 [stat.ML], V.10, May 1, 2014, 14 Pages.

Kusner, M., et al., "GANS for Sequences of Discrete Elements with the Gumbel-softmax Distribution", arXiv Preprint arXiv:1611.04051 [stat.ML], V.1, Nov. 12, 2016, 6 Pages.

Li, J., et al., "Adversarial Learning for Neural Dialogue Generation", arXvi Preprint arXvi:1701.06547 [cs.CL], V.5, Sep. 24, 2017, 13 Pages.

Lin, K., et al., "Adversarial Ranking for Language Generation", arXiv Preprint arXiv:1705.11001 [cs.CL], V.3, Apr. 16, 2018, 11 Pages.

Makhzani, A., et al., "Adversarial Autoencoders", arXiv Preprint arXiv:1511.05644 [cs.LG], V.2, May 25, 2016, 16 Pages.

Mikolov, T., et al., "Recurrent Neural Network Based Language Model", Interspeech 2010, Sep. 2010, 4 Pages, Makuhari, Chiba, Japan.

Press., O., et al., "Language Generation with Recurrent Generative Adversarial Networks without Pre-Training", arXiv Preprint arXiv:1706.01399 [cs.CL], V.3, Dec. 21, 2017, 5 Pages.

Rajeswar, S., et al., "Adversarial Generation of Natural Language", arXiv Preprint arXiv:1705.10929 [cs.CL], V.1, May 31, 2017, 11 Pages.

Salimans, T., et al., "Improved Techniques for Training GANs", arXiv Preprint arXiv:1606.03498 [cs.LG], V.1, Jun. 10, 2016, 10 Pages.

Spinks, G., et al., "Generating Continuous Representations of Medical Texts", Proceedings of NAACL-HLT 2018 Demonstrations, Jun. 2018, pp. 66-70, New Orleans, Louisiana.

Wang, J., et al., IRGAN: A Minimax Game for Unifying Generative and Discriminative Information Retrieval Models, arXiv Preprint arXiv:1705.10513 [cs.IR], V.2, Feb. 22, 2018, 12 Pages.

Williams, R., et al., "A Learning Algorithm for Continually Running Fully Recurrent Neural Networks", Neural Computation, vol. 1, Issue 2, Jun. 1989, 10 Pages.

Wu., L., et al., "Adversarial Neural Machine Translation", arXiv Preprint arXiv:1704.06933 [cs.CL], V.4, Sep. 30, 2018, 11 Pages.

Xu., K., et al., "Show, Attend and Tell: Neural Image Caption Generation with Visual Attention", arXiv Preprint arXiv:1502.03044 [cs.LG], V.3, Apr. 19, 2016, 22 Pages.

Yang, Z., et al., "Improving Neural Machine Translation with Conditional Sequence Generative Adversarial Nets", arXiv Preprint arXiv:1703.04887 [cs.CL], V.4., Apr. 8, 2018, 10 Pages.

Yang, Z., et al., Semi-Supervised QA with Generative Domain-Adaptive Nets., arXiv Preprint arXiv:1702.02206 [cs.CL], V.2, Apr. 22, 2017, 11 Pages.

Yu, L., et al., "SeqGAN: Sequence Generative Adversarial Nets with Policy Gradient", Association for the Advancement of Artificial Intelligence, Aug. 2017, 11 Pages.

Zhang, Y., et al., "Adversarial Feature Matching for Text Generation", arXiv Preprint, arXiv:1706.03850 [stat.ML], V.3, Nov. 18, 2017, 10 Pages.

Zhao, J., et al., "Adversarially Regularized Autoencoders", arXvi Preprint arXvi:1706.04223 [cs.LG], V.1 Jun. 29, 2018, 16 Pages.

Zhu, Y., et al., "Texygen: A Benchmarking Platform for Text Geneation Models", arXiv Preprint arXiv: 1802.01886 [cs. CL], V. 1, Feb. 6, 2018, 4 Pages.

Dizaji, K., et al., "Deep Clustering via Joint Convolutional Autoencoder Embedding and Relative Entropy Minimization", arXiv: 1704.06327v3, [cs.LG], Aug. 9, 2017, 13 Pages.

Zhong, G., et al., "Generative Adversarial Networks with Decoder-Encoder Output Noise", arXiv:1807.03923v1, [cs.CV], Jul. 11, 2018, 12 Pages.

(56) References Cited

OTHER PUBLICATIONS

Vlachostergiou, A., et al., "Learning Representations of Natural Language Texts with Generative Adversarial Networks at Document, Sentence, and Aspect Level", Algorithms, 11(10):164, Oct. 22, 2018, 22 Pages.

* cited by examiner

LATENT SPACE AND TEXT-BASED GENERATIVE ADVERSARIAL NETWORKS (LATEXT-GANS) FOR TEXT GENERATION

TECHNICAL FIELD

The present disclosure relates generally to generative adversarial networks (GANs) and, in particular, to methods and systems for latent space and text-based GANs (LATEXT-GANs) for text generation.

BACKGROUND

Deep learning has shown great success in various domains such as natural language processing (NLP), autonomous driving, gaming, and unsupervised learning. Generative adversarial networks (GANs) have been developed to generate realistic-looking synthetic images. GANs correspond to a mini-max two-player game where two models (e.g., two artificial neural networks) are trained simultaneously: a generative model G that captures data distribution, and a discriminative model D that computes a probability that describe whether a sample comes from the training data rather than from the generator. GAN solutions can be useful when there is a scarcity of training samples.

GANs have achieved substantial success in the field of computer vision for generating realistic-looking images. However, applying a GAN to NLP applications can be technically challenging because of the discrete nature of natural languages (e.g., text in a language does not map to real numbers with an inherent mapping function). For example, one technical problem relates to backpropagation. In NLP applications, text is a sequence of discrete words, and the output of the generator would be a discrete representation of the sequence of words. The discrete nature of the representation of the sequence of words output by the generator makes the backpropagation procedure, which is used in training the GAN, difficult.

Accordingly, more efficient and robust techniques for training a GAN for NLP applications are desirable.

SUMMARY

Technical advantages are generally achieved, by embodiments of this disclosure which describe methods and systems for training a latent space and text-based generative adversarial networks (LATEXT-GANs) for text generation.

In accordance to embodiments, an encoder neural network may receive a one-hot representation of a real text. The real text may comprise a sequence of words. The encoder neural network may also output a latent space representation of the real text generated from the one-hot representation of the real text. A decoder neural network may receive artificial code generated by a generator neural network of the GAN from random noise data. The decoder neural network may output softmax representation of artificial text generated from the artificial code. The decoder neural network may receive the latent space representation of the real text. The decoder neural network may output a reconstructed softmax representation of the real text generated from the latent space representation of the real text. The reconstructed softmax representation of the real text may comprise a soft-text that is a continuous representation of the real text. A hybrid discriminator neural network may receive a combination of the soft-text and the latent space representation of the real text and a combination of the softmax representation of artificial text and the artificial code. The hybrid discriminator neural network may output a probability indicating whether the combination of the softmax representation of artificial text and the artificial code received by the hybrid discriminator neural network is similar to the combination of the soft-text and the latent space representation of the real text.

In accordance to embodiments, an encoder neural network may receive a one-hot representation of a real text. The real text comprising a sequence of words. The encoder neural network may output a latent space representation of the real text generated from the one-hot representation of the real text. A decoder neural network may receive artificial code generated by a generator neural network of the GAN from random noise data. The decoder neural network may output softmax representation of artificial text generated from the artificial code. The decoder neural network may receive the latent space representation of the real text. The decoder neural network may output a reconstructed softmax representation of the real text generated from the latent space representation of the real text. The reconstructed softmax representation of the real text may comprise a soft-text that is a continuous representation of the real text. A first discriminator neural network (e.g., a text-based discriminator neural network) may receive the soft-text and the softmax representation of artificial text. The first discriminator neural network may output a first probability indicating whether the softmax representation of artificial text received by the first discriminator neural network is similar to the soft-text. A second discriminator neural network (e.g., a code-based discriminator neural network) may receive the latent space representation of the real text and the artificial code. The second discriminator neural network may output a second probability indicating whether the artificial code received by the second discriminator neural network is similar to the latent space representation of the real text.

In accordance to embodiments, an encoder neural network may receive a one-hot representation of a real text. The real text comprising a sequence of words. The encoder neural network may output a latent space representation of the real text generated from the one-hot representation of the real text. A decoder neural network may receive random noise data. The decoder neural network may output softmax representation of artificial text generated from the random noise data. The decoder neural network may receive the latent space representation of the real text. The decoder neural network may output a reconstructed softmax representation of the real text generated from the latent space representation of the real text. The reconstructed softmax representation of the real text may comprise a soft-text that is a continuous representation of the real text. A first discriminator neural network (e.g., a text-based discriminator neural network) may receive the soft-text and the softmax representation of artificial text. The first discriminator neural network may output a first probability indicating whether the softmax representation of artificial text received by the first discriminator neural network is similar to the soft-text. A second discriminator neural network (e.g., a code-based discriminator neural network) may receive the latent space representation of the real text and the random noise data. The second discriminator neural network may output a second probability indicating whether the random noise data received by the second discriminator neural network is similar to the latent space representation of the real text.

Apparatuses, as well as computer program products, for performing the methods are also provided.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. These and other inventive aspects are described in greater detail below.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

A generative adversarial network (GAN) includes two separate deep artificial neural networks: a generator artificial neural network (generally referred to as a generator) and a discriminator artificial neural network (generally referred to as a discriminator). During training of the GAN, the generator receives random variables, z, with a probability distribution $P_z(z)$ and generates artificial samples (e.g., images or text) based on the received random variables, z. The discriminator receives real samples (e.g., real or observed images or text) and the artificial samples generated by the generator, and the discriminator predicts whether the artificial samples generated by the generator are real samples or artificial samples. The discriminator outputs a probability value of 1 when the discriminator predicts that the artificial samples are real samples, and a probability value of 0 when the discriminator predicts that the artificial samples are artificial samples. In the GAN training process, the generator and the discriminator are trained together to improve the performance of each other in an adversarial manner. A GAN implements a two-player mini-max game with the objective of deriving a Nash-equilibrium. The generator and the discriminator are trained together until the following adversarial loss function for the GAN is optimized:

$$\min_G \max_D \{E_{x \sim P_{data}(x)}[\log D(x)] + E_{z \sim P_z(z)}[\log(1 - D(G(z)))]\} \quad \text{Equation (1)}$$

Figure 1:
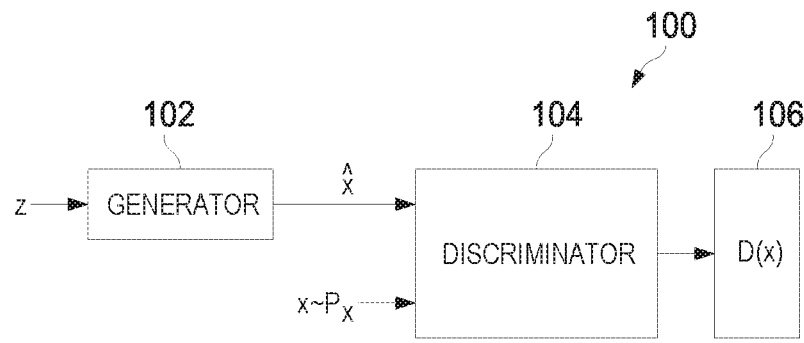
FIG. 1 is a block diagram of an example generative adversarial network (GAN)

FIG. 1 illustrates a block diagram of a generative adversarial network (GAN) 100. The GAN 100 may execute on one or more processing units. Examples of the processing units include, but are not limited to, graphics processing units (GPUs), tensor processing units (TPUs), application-specific integrated circuits (ASCIs), field-programmable gate arrays (FPGAs), artificial intelligence (AI) accelerators, or combinations thereof. The GAN 100 includes a generator 102, configured to receive random variables z and generate, from random variables z, artificial samples $\hat{x}$ that are similar or close to the content of real samples x taken from a set of training samples comprising real samples once GAN is trained. The GAN 100 also includes a discriminator 104. The discriminator 104 is configured to receive both real samples x taken from the set of training samples and the artificial samples $\hat{x}$ generated by the generator 102 and predict a probability D(x) of whether the artificial sample $\hat{x}$ is a real sample x (i.e., the artificial sample matches real sample x in the set of training samples).

Figure 2:
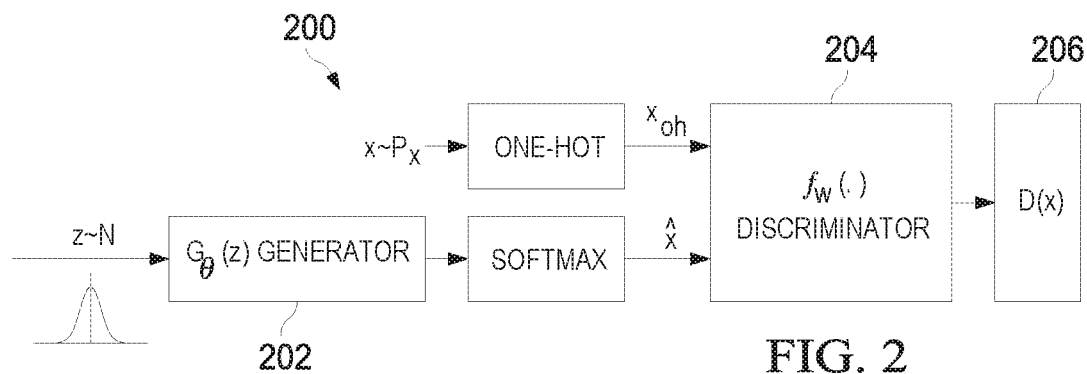
FIG. 2 illustrates a block diagram of a conventional GAN with a text-based generator.

GANs have achieved substantial success in the field of computer vision for generating realistic artificial images. Such success has motivated utilization of GANs in NLP applications as well. However, utilizing GANs in NLP applications has been challenging because of the discrete nature of natural languages (e.g., text in a language does not map to real numbers with an inherent mapping function). NLP applications utilize a natural language dictionary in all aspects of natural languages processing. The natural language dictionary includes K unique words in which each word is mapped to a K-dimensional representation. FIG. 2 illustrates a block diagram of a conventional GAN 200 with a text-based generator 202. The GAN 200 may execute on one or more processing units described above. The GAN 200 includes the text-based generator 202, configured to receive random variables z and generate artificial samples $\hat{x}$ based on random variables z. In the example shown in FIG. 2, the generator 202 is configured to receive random variables z, and generate and output a K-dimensional vector of arbitrary real numbers. A softmax function is applied to the K-dimensional vector of arbitrary real numbers output by the generator 202 to generate a representation of an artificial sample $\hat{x}$. The softmax function is a generalization of the logistic function that "squashes" a K-dimensional vector of arbitrary real numbers to a K-dimensional vector of real numbers, in which each entry of the vector is a real number in the range (0, 1), and all the real numbers add up to 1. The K-dimensional vector of real numbers, in Which each entry of the vector is a real number in the range (0, 1), that is output by the softmax function can be used to represent a categorical distribution. That is, a probability distribution over K different possible real numbers. Thus, in the example shown in FIG. 2, the artificial sample x̂ output from the softmax function is the K-dimensional vector of real numbers in which each entry is a real number the range (0, 1), and is referred to as a softmax representation of artificial text. The arg-max function is applied to the softmax representation of artificial text during inference (e.g., after training the GAN is completed) to obtain a representation that maps to words in the natural language dictionary.

The GAN 200 also includes a discriminator 204, Which is configured to receive both an artificial sample x̂ (e.g., a softmax representation of artificial text output by the generator 202) and a real sample x from a training set of real samples and output a probability value that the artificial sample x̂ matches the real sample x in the training set of real samples. The real sample x is a one-hot representation of real text from a set of real texts. A one-hot representation is a group of bits among which the allowable combinations of values are only those with a single high (1) bit and all the others low (0). For example, when text is words and the natural language dictionary comprises four words, x1, x2, x3, and x4, the word x1 may have a one-hot representation of 0001. The word x2 may have a one-hot representation of 0010. The word x3 may have a one-hot representation of 0100. The word x4 may have a one-hot representation of 1000. In FIG. 2, the box labelled with "ONE-HOT" encodes the real text into the one-hot representation.

For each artificial sample x̂ received by the discriminator 204 from the generator 202, the discriminator 204 predicts and outputs a probability D(x) of whether the artificial sample x̂ received by the discriminator 204 is real (i.e., the softmax representation of artificial text matches a one-hot representation of real text in a set of real texts) or fake (i.e., the softmax representation of artificial text generated by the generator 202 does not match a one-hot representation of real text in a set of real texts).

Figure 3:
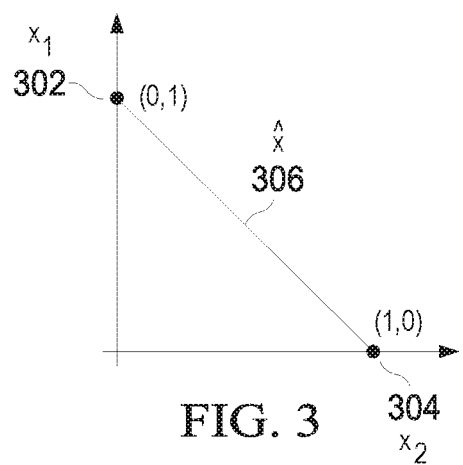
FIG. 3 shows the locus of the input vectors to a discriminator of a conventional GAN for a two-word language.

In conventional GAN systems with text-based discriminators, such as GAN 200, the discriminator 204 is responsible for distinguishing between the one-hot representation of the real text and the softmax representation of artificial text received from the generator 202. A technical disadvantage of this conventional technique is that the discriminator is able to easily tell apart the one-hot representation of the real text from the softmax representation of artificial text. In other words, the generator 202 would have a hard time fooling the discriminator 204. This results in poor training of the GAN 200 and a vanishing gradient is highly likely to occur. FIG. 3 shows a graphical representation of the GAN 200 in which the natural language dictionary includes two-words. The example shows a locus of the softmax representation of two words to the discriminator 204 of the conventional GAN 200 for a two-word language. The two-word language includes one-hot representations of two real words: the one-hot representation of real word $x_1$ (302) and the one-hot representation of real word $x_2$ (304). The discriminator 204 receives the one-hot representations of real word $x_1$ (302) and the real word $x_2$ (304). The discriminator 204 also receives a softmax representation of artificial text x̂ (306) generated by the generator 202. FIG. 3 depicts the one-hot representations of these two real words as the two discrete points 302 and 304 in the Cartesian space. FIG. 3 also shows the span of the softmax representation of artificial words over the one-hot representations of the two words (i.e., the line segment 306 connecting the points $x_1$ 302 and $x_2$ 304). As FIG. 3 illustrates, the task of the discriminator 204 is to discriminate the points 302 and 304 from the line 306 connecting these two points, which would be an easy task for the discriminator 204.

Additionally, the discrete nature of the text of natural languages presents technical problems in training a GAN for text generation. For the GAN training, the representation of softmax representation of artificial text generated from the generator 202 needs to be differentiable for back-propagating the gradient from the discriminator. Therefore, the arg-max function cannot be applied.

The conventional systems, such as the GAN 200, use the discriminator to discriminate the softmax representation of artificial text from the one-hot representation of real text, in which there is a clear downside as the discriminator receives two different types of the inputs: a one-hot representation of the real text and a softmax representation of artificial text. The consequence is that the discrimination task performed by the discriminator 204 becomes too easy. Particularly, to the discriminators in some conventional GAN systems, the one-hot representations of real text can be easily discriminated from the softmax representations of artificial text, which leads to vanishing gradient. Consequently, the softmax representation of artificial text generated by the generator 202 is less realistic.

To solve these technical problems, embodiments of this application use technical solutions that utilize autoencoders to learn continuous representations of the real text rather than the one-hot representations of real text. A continuous representation of real text is a K-dimensional vector of real numbers in which each entry of the K-dimensional vector is a probability (which is a continuous function that has a value between 0 and 1), and the probabilities of the K-dimensional vector sum to 1. Each entry of the K-dimensional vector maps to a word in a natural language dictionary of K unique words. An autoencoder is a type of artificial neural network used to learn efficient representations of text. The purpose of an autoencoder is to learn representations for a set of real text from a natural language dictionary that includes K-words, typically for the goal of dimensionality reduction. An autoencoder includes two networks: an encoder artificial neural network (hereinafter encoder neural network) and a decoder artificial neutral network (hereinafter decoder neural network). The encoder neural network of the autoencoder learns to map a one-hot representation of real text into a latent representation, and then the decoder neutral network of the autoencoder learns to decode the latent representation into a representation that closely matches the original one-hot representation of real text, referred to hereinafter as a reconstructed representation.

In example embodiments, the LATENT-GAN may learn a softmax representation of real text (i.e., soft-text), which is a continuous representation of the real text. In contrast to the conventional GAN 200, the soft-text is input into the discriminator of a GAN. Inputting the soft-text into the discriminator as opposed to a one-hot representation of real text makes the discrimination task of the discriminator more difficult. Consequently, the soft-text approach provides a richer signal to the generator. At the time of training, the generator of the LATENT GAN may try to learn continuous representations that are similar to the soft-text, which can later on be mapped to the real text by applying the arg-max function.

Figure 4:
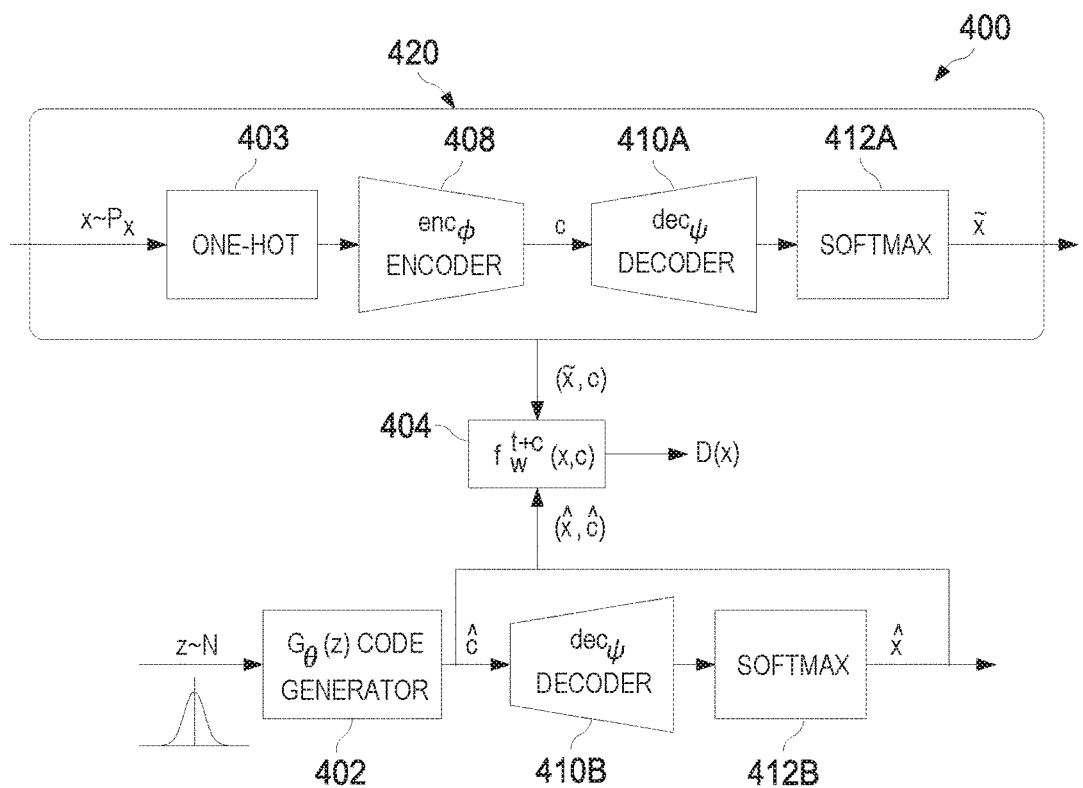
FIG. 4 illustrates a diagram of a LATEXT-GAN for text generation, according to some embodiments.

FIG. 4 illustrates a block diagram of a LATEXT-GAN for text generation, according to an embodiment. The LATEXT-GAN (hereinafter referred to as LATEX-GAN I 400) shows embodiments in which the discriminator of the GAN discriminates between a combined latent code and soft-text as described in further detail below. The LATEXT-GAN I 400 may be implemented in software comprising computer-readable code or instructions, which may be executed by one or more processing devices of a processing system, such as processing devices 1002 (FIG. 10) of the processing system 1000 (FIG. 10) described below. The LATEXT-GAN I 400 includes a generator artificial neural network 402 (hereinafter generator neural network 402) and a hybrid discriminator artificial neural network 404 (hereinafter hybrid discriminator neural network 404). The generator neural network 402 is deep neural network comprising neural network parameters θ. The hybrid discriminator neural network 404 is also a deep neural network comprising neural network parameters w. The LATEXT-GAN I 400 further includes an autoencoder 420, which comprises a one-hot operator 403, an encoder artificial neural network 408 (hereinafter encoder neural network 408) and a decoder artificial neural network 410, and a softmax operator 412A. FIG. 4 depicts the decoder neural network 410 as if there are two decoder neural networks 410A and 410B and the softmax operator 412 as if there are two softmax operators 412A and 412B. This is for illustration purposes only. The decoder neural networks 410A and 410B are the same decoder neural network 410. That is, the decoder neural networks 410A and 410B are the same deep neural network comprising the same parameters ψ. The softmax operators 412A and 412B are also the same softmax operator 412. That is, the softmax operators 412A and 412B apply the same softmax function.

The encoder neural network is a deep neural network comprising neural network parameters φ. The encoder neural network 408 is configured to receive a one-hot representation of the real text (x), generate a latent representation (c) of the real text, and output the latent representation. (c). In FIG. 4, the one hot operator 403 encodes the real text into the one-hot representation based on the K-word natural language dictionary. The latent representation captures the semantic closeness of words and is a condensed representation of the one-hot representation of text. The latent representation is an N-dimensional vector of real numbers, N is less than K, the number of words in the natural language dictionary.

The decoder neural network 410A is configured to receive the latent representation (c) of the real text, decode the latent representation (c) into a reconstructed representation of the real text from the latent representation of the real text, and output a reconstructed representation of the real text. The softmax operator 412A is configured to perform a softmax function on the reconstructed representation of real text output by the decoder 410A to generate a reconstructed softmax representation of the real text. The autoencoder 420 outputs the reconstructed softmax representation of the real text, which is referred to as soft-text ($\tilde{x}$). The reconstructed softmax representation of the real text (e.g., soft-text $\widetilde{(x)}$) is a continuous representation of the real text (e.g., a K-dimensional vector of real numbers in which each entry of the K-dimensional vector is a probability (which is a continuous function that has a value between 0 and 1), and the probabilities of the K-dimensional vector sum to 1).

In the LATEXT-GAN I 400, the soft-text ($\tilde{x}$) and the latent representation (c) of the real text generated by the autoencoder 120 are combined to generate a combination ($\tilde{x}$, c) including the soft-text ($\tilde{x}$) and the latent representation c of the real text from the autoencoder 420. In some embodiments, the LATEXT-GAN I 400 combines the soft-text ($\tilde{x}$) and the latent representation (c) of the real text generated by the autoencoder 120 using concatenation.

The generator neural network 402 is configured to generate the artificial code ($\hat{c}$), generated from random noise data (z). The decoder neural network 410B is also configured to receive the artificial code ($\hat{c}$), generate a representation of artificial text (from the artificial code ($\hat{c}$), and output the representation of artificial text. The softmax operator 412B is configured to perform a softmax function on the representation of artificial text output from decoder neural network 410B to generate a softmax representation of artificial text ($\hat{x}$). In the LATEXT-GAN I 400, the softmax representation of artificial text ($\hat{x}$) and the artificial code ($\hat{c}$) are combined using, for example, concatenation, to generate the combination ($\hat{x}$, $\hat{c}$) including the softmax representation of artificial text ($\hat{x}$) and the artificial code ($\hat{c}$).

The hybrid discriminator neural network 404 is configured to receive the combinations ($\hat{x}$, $\hat{c}$) and ($\tilde{x}$, c), predict and output a probability D(x) of whether the input combination ($\tilde{x}$, c), is a real (i.e., a probability that the input combination ($\hat{x}$, $\hat{c}$) of the softmax representation of artificial text ($\hat{x}$) and the artificial code $\hat{c}$ matches the combination ($\tilde{x}$, c) of the soft-text ($\tilde{x}$) and the latent representation c of the real text) or a fake (i.e., a probability that the input combination ($\hat{x}$, $\hat{c}$) of the softmax representation of artificial text ($\hat{x}$) and the artificial code ($\hat{c}$) does not match the input combination ($\tilde{x}$, c) of the soft-text ($\tilde{x}$) and the latent representation (c) of the real text).

The LATEXT-GAN I 400 is trained to learn to generate artificial samples (e.g. softmax representations of artificial text ($\hat{x}$)) that mimic the real samples (e.g., the reconstructed softmax representation of real text ($\tilde{x}$).) using the following training process. In an epoch, the autoencoder 420 is trained by initializing the parameters φ of the encoder neural network 408 and the parameters ψ of the decoder neural network 410, and using backpropagation and a reconstruction loss function $L_{AE}(\varphi,\psi)$ which is evaluated by solving the following optimization problem:

$$L_{AE}(\varphi,\psi)=\min_{(\varphi,\psi)}(\|x-\text{softmax}(\text{dec}_\psi(\text{enc}_\varphi(x)))\|^2)$$

Here, x is the one-hot representation of the real text. φ denotes parameters of the encoder neural network 408. ψ denotes parameters of the decoder neural network 410.

The LATEXT-GAN I 400, in the same epoch, then uses backpropagation and the discriminator loss function $L_{critic-ALI}$ with a gradient penalty to train the hybrid discriminator neural network 404, the encoder neural network 408, and the decoder neural network 410. The discriminator loss function $L_{critic-ALI}$ with a gradient penalty is evaluated by solving the following optimization problem:

$$L_{critic-ALI} = \min_{(w,\varphi,\psi)}\left(-E_{(\tilde{x},c)\sim P_{\tilde{x}}P_c}[f_w^{t+c}(\tilde{x},c)] + E_{(\hat{x},\hat{c})\sim P_{\hat{x}}P_{\hat{c}}}[f_w^{t+c}(\hat{x},\hat{c})] + \lambda E_{(\overline{x},\overline{c})\sim P_{\overline{x}}P_{\overline{c}}}\left[(\|\nabla_{(\overline{x},\overline{c})}f_w^{t+c}(\overline{x},\overline{c})\|_2 - 1)^2\right]\right)$$

Here, $\tilde{x}$ is the softmax representation of the decoder output (e.g., soft-text). $\hat{c}$ is the artificial code. $\hat{x}$ is the softmax representation of artificial text. c is the latent representation of the real text. $\overline{x}$ denotes random samples obtained by sampling uniformly along a line connecting pairs of softmax representation of artificial text and real text. $\overline{c}$ denotes random latent code samples obtained by sampling uniformly along a line connecting pairs of the artificial code and the latent representation of the real text. λ is a gradient penalty coefficient. w denotes parameters of the hybrid discriminator neural network 404. φ denotes parameters of the encoder neural network 408. ψ denotes parameters of the decoder neural network 410.

The LATEXT-GAN I 400, in the same epoch, also uses backpropagation and the generator loss function $L_{Gen-ALI}$ to train the generator neural network 402 and the decoder neural network 410. The generator loss function $L_{Gen-ALI}$ is evaluated by solving the following optimization problem:

$$L_{Gen-ALI} = \min_{(\theta,\psi)} (-E_{(\tilde{x},\hat{c})-P_{\tilde{x}},P_{\hat{c}}}[f_w^{t+c}(\tilde{x},\hat{c})] + E_{(\tilde{x},c)-P_{\tilde{x}},P_c}[f_w^{t+c}(\tilde{x},c)])$$

Here, $\hat{x}$ is the softmax representation of artificial text. c is the latent representation of the real text. $\tilde{x}$ is the soft-text. $\hat{c}$ is the artificial code. θ denotes parameters of the generator neural network 402. ψ denotes parameters of the decoder neural network 410.

The training process is repeated for several epochs until the LATENT GAN I 400 is trained (e.g., the neural network parameters φ of the encoder neural network 408, the neural network parameters ψ of the decoder neural network 410, the neural network parameters θ of the generator neural network 402, and the neural network parameters w of the hybrid discriminator 404) are learned. After the LATENT GAN I 400 is trained, the generator 402 may be used to generate artificial codes which is decoded by the decoder neural network 410B and softmax operator 412B to generate artificial samples (e.g. softmax representations of artificial text ($\hat{x}$)) that mimic the real samples (e.g., the reconstructed softmax representation of real text ($\tilde{x}$).). The artificial samples (e.g., softmax representations of artificial text ($\hat{x}$)) may be decoded to generate one-hot representations of the text using the K-word natural language dictionary. The one-hot representations of text may be converted into text and output for display on an output device, such as output device 1016 (FIG. 10) of the processing system 1000 (FIG. 10) described below.

Figure 5:
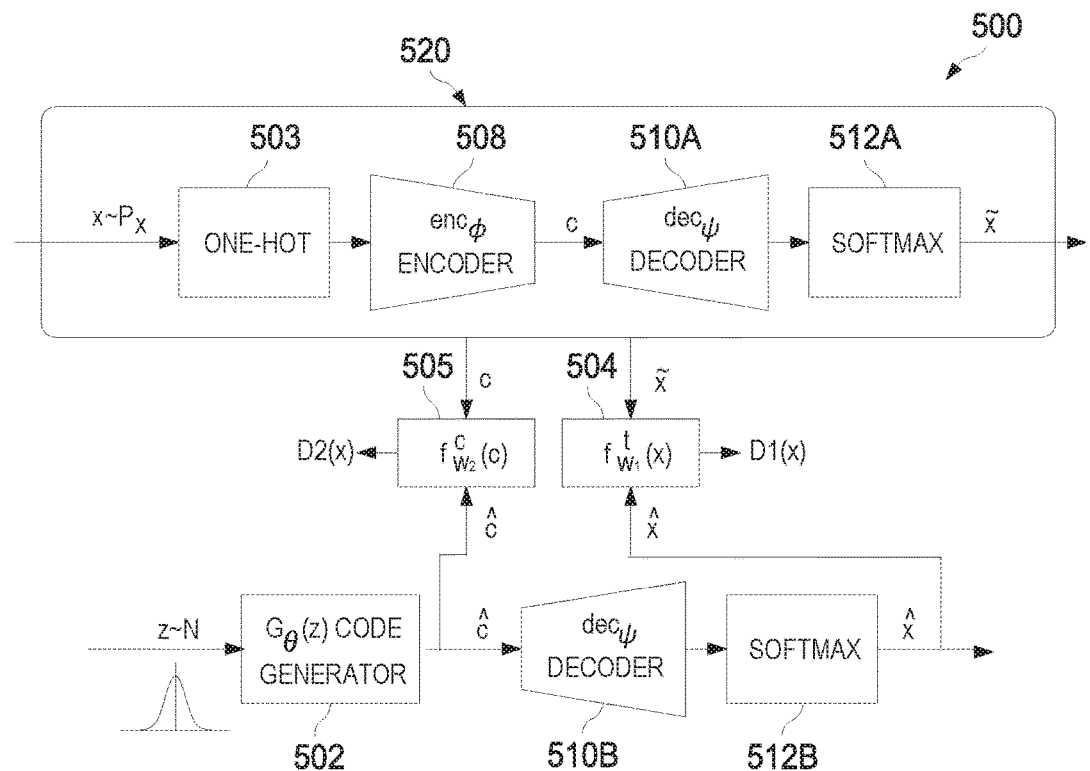
FIG. 5 illustrates a diagram of a LATEXT-GAN II for text generation, according to some embodiments.

FIG. 5 illustrates a diagram of a block diagram of a LATEXT-GAN according to another embodiment. The LATEXT-GAN depicted in FIG. 5 is referred to hereinafter as LATEXT-GAN II 500. The LATEXT-GAN II 500 shows embodiments with multiple critics for the latent code and soft-text discrimination. The LATEXT-GAN II 500 may be implemented in software comprising computer-readable code or instructions, which may be executed on one or more processing devices of a processing system, such as processing devices 1002 of the processing system 1000 described below. The LATEXT-GAN II 500 includes a generator artificial neural network 502 (hereinafter generator neural network 502), a text-based discriminator artificial neural network 504 (hereinafter text-based discriminator neural network 504), and a code-based discriminator artificial neural network 505 (hereinafter code-based discriminator neural network 505). The generator neural network 502 is deep neural network comprising neural network parameters θ. The text-based neural network 504 is also a deep neural network comprising neural network parameters $w_1$ and the code-based discriminator neural network 505 is a deep neural network comprising neural network parameters $w_2$. The LATEXT-GAN II 500 further includes an autoencoder 520, which comprises an encoder artificial neural network 508 (hereinafter encoder neural network 508) and a decoder artificial neural network 510 (hereinafter decoder neural network 510). The encoder neural network 508 is a deep neural network comprising neural network parameters φ and the decoder neural network 510 is a deep neural network comprising neural network parameters ψ. FIG. 5 depicts the decoder neural network 510 as if there are two decoder neural networks 510A and 510B and the softmax operator 512 as if there are two softmax operators 512A and 512B. This is for illustration purposes only. The decoder neural networks 510A and 510B are the same decoder neural network 510. That is, the decoder neural networks 510A and 510B are the same deep neural network comprising the same neural network parameters ψ. In some embodiments, the decoder neural networks 510A and 510B may be two different decoder neural networks having different neural network parameters. The softmax operators 512A and 512B are also the same softmax operator 512. That is, the softmax operators 512A and 512B apply the same softmax function.

The encoder neural network 508 is configured to receive the one-hot representation of the real text (x) and output a latent space representation (c) of the real text in the latent space. In FIG. 5, the one-hot operator 503 encodes the real text into the one-hot representation based on the K-word dictionary. The latent representation captures the semantic closeness of words and is a condensed representation of the one-hot representation of text. The latent representation is an N-dimensional vector of real numbers. N is less than K, the number of words in the natural language dictionary.

The decoder neural network 510 (shown as the decoder 510A) is configured to receive the latent representation (c) of the real text and output a reconstructed representation of the real text generated from the latent representation of the real text. The softmax operator 512A is configured to receive the reconstructed representation of the real text and perform a softmax function on the reconstructed representation of real text output by the decoder 510A to generate a reconstructed softmax representation of the real text ($\tilde{x}$), which is referred to as soft-text ($\tilde{x}$). The reconstructed softmax representation of the real text (e.g., soft-text ($\tilde{x}$)) is a continuous representation of the real text (e.g., a K-dimensional vector of real numbers in which each entry of the K-dimensional vector is a probability (which is a continuous function that has a value between 0 and 1), and the probabilities of the K-dimensional vector sum to 1).

In the LATEX-GAN II 500, the text-based discriminator neural network 504 receives the soft-text ($\tilde{x}$). The soft-text ($\tilde{x}$) is obtained from the decoder neural network 510. The code-based discriminator neural network 505 receives the latent representation (c) of the real text. The latent representation (c) is obtained from the encoder neural network 508.

The generator neural network 502 is configured to receive random noise data and generate an artificial code ($\hat{c}$) from random noise data (z), and output the artificial code ($\hat{c}$). The decoder neural network 510B is also configured to receive the artificial code ($\hat{c}$), and decode the artificial code ($\hat{c}$) into a representation of artificial text, and output the representation of artificial text. The softmax operator 512B is configured to receive the representation of artificial text and perform a softmax function on the representation of artificial text to generate a softmax representation of artificial text (e.g., soft-text ($\hat{x}$)). The text-based discriminator neural network 504 is configured to also receive the softmax representation of artificial text ($\hat{x}$). The softmax representation of artificial text ($\hat{x}$) is received from the softmax operator 512B. The code-based discriminator neural network 505 is also configured to receive the artificial code ($\hat{c}$). The artificial code ($\hat{c}$) is received from the generator neural network 502.

The text-based discriminator neural network 504 is configured to predict and output a probability D1(x) of whether the input sample is a real (i.e., a probability that the softmax representation of artificial text ($\hat{x}$) matches the soft-text ($\tilde{x}$))

or a fake (i.e., a probability that the softmax representation of artificial text ($\hat{x}$) does not match the soft-text ($\tilde{x}$)).

The code-based discriminator neural network 505 is configured to predict and output a probability D2(x) of whether the input sample is a real (i.e., the artificial code ($\hat{c}$) matches the latent representation (c) of the real text) or a fake (i.e., the artificial code ($\hat{c}$) does not match the latent space representation (c) of the real text).

The LATEXT-GAN II 500 is trained to learn to generate artificial samples (e.g. softmax representations of artificial text ($\hat{x}$)) that mimic the real samples (e.g., the reconstructed softmax representation of real text ($\tilde{x}$).) using the following training process. In an epoch, the autoencoder 520 is trained by initializing the parameters $\varphi$ of the encoder neural network 408 and the parameters $\psi$ of the decoder neural network, and using backpropagation and the reconstruction loss function $L_{AE}(\varphi,\psi)$ which is evaluated by solving the following optimization problem.

$$L_{AE}(\varphi,\psi)=\min_{(\varphi,\psi)}(\|x-\text{softmax}(\text{dec}_\psi(\text{enc}_\varphi(x)))\|^2) \quad \text{Formula (4)}:$$

Here, x is the one-hot representation of the real text. $\varphi$ denotes parameters of the encoder neural network 508, and $\psi$ denotes parameters of the decoder neural network 510.

The LATEXT-GAN II 500, in the same epoch, then uses backpropagation and the text-based discriminator loss function $L_{critic1}$ to train the text-based discriminator neural network 504 and the decoder neural network 510, which is evaluated by solving the following optimization problem.

$$L_{critic1} = \min_{(w_1,\psi)}\left(-E_{(\tilde{x})\sim P_{\tilde{x}}}[f^t_{w_1}(\tilde{x})] + \right.$$
$$\left. E_{(\hat{x})\sim P_{\hat{x}}}[f^t_{w_1}(\hat{x})] + \lambda_1 E_{\bar{x}\sim P_{\bar{x}}}[(\|\nabla_{(\bar{x})}f^t_{w_1}(\bar{x})\|_2 - 1)^2]\right) \quad \text{Formula (5)}$$

Here, $\tilde{x}$ is the soft-text. $\hat{x}$ is the softmax representation of artificial text. $\bar{x}$ denotes random data samples obtained by sampling uniformly along a line connecting pairs of generated and soft-text samples. $\lambda_1$ is a gradient penalty coefficient. $w_1$ denotes the neural network parameters of the text-based discriminator neural network 504. $\psi$ denotes the neural network parameters of the decoder neural network 510.

The LATEXT-GAN II 500, in the same epoch, also uses backpropagation and the code-based discriminator loss function $L_{critic2}$ to train the code-based discriminator neural network 505 and the encoder neural network 508, which is evaluated by solving the following optimization problem:

$$L_{critic2}=\min_{(w_2,\varphi)}(E_{\hat{c}\sim P_{\hat{c}}}[f^c_{w_2}(\hat{c})]-E_{c\sim P_c}[f^c_{w_2}(c)]+\lambda_2 E_{\bar{c}\sim P_{\bar{c}}}[(\|\nabla_{(\bar{c})}f^c_{w_2}(\bar{c})\|_2-1)^2]) \quad \text{Formula (6)}:$$

Here, c is the latent space representation of the real text. $\hat{c}$ is the artificial code. $\bar{c}$ denotes random latent code samples obtained by sampling uniformly along a line connecting pairs of the artificial code and the latent space representation of the real text. $\lambda_2$ is a gradient penalty coefficient. $w_2$ denotes the neural network parameters of the code-based discriminator neural network 505. $\varphi$ denotes the neural network parameters of the encoder neural network 508.

The LATENT-GAN II 500, in the same epoch, also uses backpropagation and the generator loss function $L_{Gen-ARAE-mul}$ to train the generator neural network 502 and the decoder neural network 510, which is evaluated by solving the following optimization problem:

$$L_{Gen-ARAE-mul} = \min_{(\theta,\psi)}\left(-E_{\hat{x}\sim P_{\hat{x}}}[f^t_{w_1}(\hat{x})] + \right.$$
$$\left. E_{(\tilde{x})\sim P_{\tilde{x}}}[f^t_{w_1}(\tilde{x})] - E_{\hat{c}\sim P_{\hat{c}}}[f^c_{w_2}(\hat{c})] + E_{c\sim P_c}[f^c_{w_2}(c)]\right) \quad \text{Formula (7)}$$

Here, $\hat{x}$ is the softmax representation of artificial text. c is the latent space representation of the real text. $\hat{c}$ is the artificial code. $\tilde{x}$ is the soft-text. $\theta$ denotes the neural network parameters of the generator neural network 502. $\psi$ denotes the neural network parameters of the decoder neural network 510.

The training process is repeated for several epochs until the LATENT GAN II 500 is trained (e.g., the neural network parameters $\varphi$ of the encoder neural network 508, the neural network parameters $\psi$ of the decoder neural network 510, the neural network parameters $\theta$ of the generator neural network 502, and the neural network parameters $w_1$ of the text-based discriminator neural network 504, and the neural network parameters $w_2$ of the code-based discriminator neural network 505) are learned. After the LATENT GAN II 500 is trained, the generator 502 may be used to generate artificial codes which is decoded by the decoder neural network 510B and softmax operator 512B to generate artificial samples (e.g. softmax representations of artificial text ($\hat{x}$)) that mimic the real samples (e.g., the reconstructed softmax representation of real text ($\tilde{x}$).). The artificial samples (e.g., softmax representations of artificial text ($\hat{x}$)) may be decoded to generate one-hot representations of the text using the K-word natural language dictionary. The one-hot representations of text may be converted into text and output for display on an output device 1016 (FIG. 10), such as output device 1016 (FIG. 10) of the processing system 1000 (FIG. 10) described below.

Figure 6:
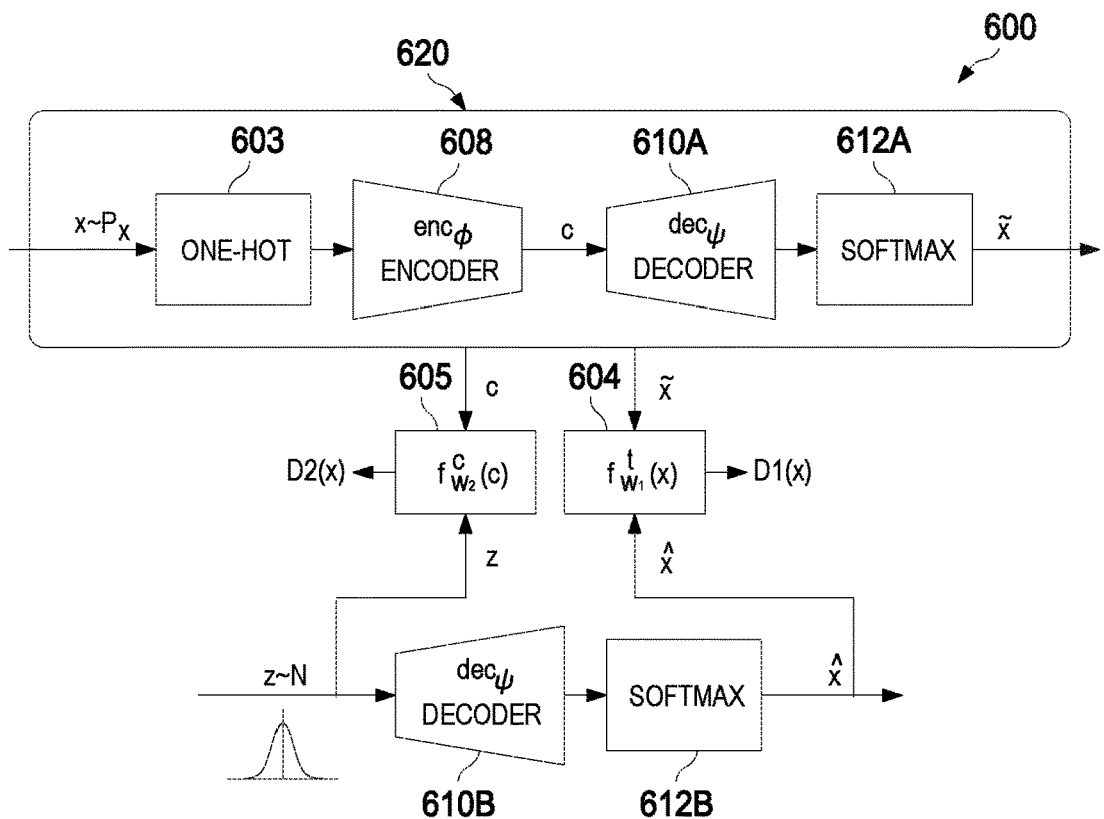
FIG. 6 illustrates a diagram of a LATEXT-GAN III for text generation, according to some embodiments.

FIG. 6 illustrates a block diagram of a LATEXT-GAN for text generation, according to another embodiment. The LATEXT-GAN depicted in FIG. 6 is referred to hereinafter as LATEXT-GAN III 600. The LATEXT-GAN III 600 shows additional embodiments with multiple critics for the latent code and soft-text discrimination. The LATEXT-GAN III 600 may be implemented in software that includes computer-readable code or instructions, which may be execute on one or more processing devices of a processing system, such as processing devices 1002 (FIG. 10) of the processing system 1000 (FIG. 10) described below. The LATEXT-GAN III 600 includes a text-based discriminator artificial neural network 604 (hereinafter text-based discriminator neural network 604) and a code-based discriminator artificial neural network 605 (hereinafter code-based discriminator neural network 605). The text-based neural network 604 is also a deep neural network comprising neural network parameters $w_1$ and the code-based discriminator neural network 605 is a deep neural network comprising neural network parameters $w_2$. The LATEXT-GAN III 600 further includes an autoencoder 620, which comprises an encoder artificial neural network 608 (hereinafter encoder neural network 608) and a decoder artificial neural network 610 (decoder neural network 610). The encoder neural network 608 is a deep neural network comprising neural network parameters $\phi$ and the decoder neural network 610 is a deep neural network comprising neural network parameters $\psi$. FIG. 6 depicts the decoder neural network 610 as if there are two decoder neural networks 610A and 610B and the softmax operator 612 as if there are two softmax operators 612A and 612B. This is for illustration purposes only. The decoder neural networks 610A and 610B are the same decoder neural network 610. That is, the decoder neural networks 610A and 610B are the same deep neural network comprising the same neural network parameters $\psi$. The softmax operators 612A and 612B are also the same softmax operator 612. That is, the softmax operators 612A and 612B apply the same softmax function. The encoder neural network 608 is configured to receive the one-hot representation of the real text (x), generate a latent space representation (c) of the real text, and output the latent space representation (c). In FIG. 6, the one-hot operator 603 encodes the real text into the one-hot representation. The latent representation captures the semantic closeness of words and is a condensed representation of the one-hot representation of text. The latent representation is an N-dimensional vector of real numbers. N is less than K, the number of words in the natural language dictionary.

The decoder neural network 610A is configured to receive the latent representation (c) of the real text, decode the latent space representation (c) into a reconstructed representation of the real text from the latent representation of the real text, and output the reconstructed representation of the real text. The softmax operator 612A of the autoencoder 620 is configured to perform a softmax function on the reconstructed representation of real text output by the decoder 610A to generate a reconstructed softmax representation of the real text. The autoencoder 620 outputs the reconstructed softmax representation of the real text, which is referred to as soft-text ($\tilde{x}$). The reconstructed softmax representation of the real text (e.g., soft-text ($\tilde{x}$)) is a continuous representation of the real text (e.g., a K-dimensional vector of real numbers in which each entry of the K-dimensional vector is a probability (which is a continuous function that has a value between 0 and 1), and the probabilities of the K-dimensional vector sum to 1).

In the LATEXT-GAN III 600, the text-based discriminator neural network 604 receives the soft-text ($\tilde{x}$). The soft-text ($\tilde{x}$) is received from the decoder neural network 610A. The code-based discriminator neural network 605 receives the latent representation (c) of the real text. The latent representation (c) is received from the encoder neural network 608.

The decoder neural network 610B is further configured to receive random noise data (z) and output a representation of artificial text from random noise data (z). The softmax operator 612B is configured to receive the representation of the artificial text and perform a softmax operation on the representation of the artificial text output by the decoder neural network 610B to generate a softmax representation of the representation of artificial text ($\hat{x}$). The text-based discriminator neural network 604 is configured to receive the softmax representation of artificial text ($\hat{x}$). The softmax representation of artificial text ($\hat{x}$) is received from the decoder neural network 610B. The code-based discriminator neural network 605 is also configured to receive the random noise data (z).

The text-based discriminator neural network 604 is configured to predict and output a probability D1(x) of whether the input sample is a real (i.e., a probability that the softmax representation of artificial text ($\hat{x}$)) matches the soft-text ($\tilde{x}$)) or a fake (i.e., a probability that the softmax representation of artificial text ($\hat{x}$)) does not match the soft-text ($\tilde{x}$)).

The code-based discriminator neural network 605 is configured to predict and output a probability D2(x) of whether the input sample is a real (i.e., a probability that the random noise data (z) matches the latent space representation (c) of the real text) or a fake (i.e., a probability that the random noise data (z) does not match the latent representation (c) of the real text).

The autoencoder 620 is trained using the reconstruction loss function $L_{AE}(\varphi,\psi)$, which is evaluated by solving the following optimization problem.

$$L_{AE}(\varphi,\psi)=\min_{(\varphi,\psi)}(\|x-\text{softmax}(\text{dec}_\psi(\text{enc}_\varphi(x)))\|^2) \quad \text{Formula (8):}$$

Here, x is the one-hot representation of the real text. $\varphi$ denotes the neural network parameters of the encoder neural network 608, and $\psi$ denotes the neural network parameters of the decoder neural network 610.

The LATEXT-GAN III 600 is trained to learn to generate artificial samples (e.g. softmax representations of artificial text ($\hat{x}$)) that mimic the real samples (e.g., the reconstructed softmax representation of real text ($\tilde{x}$).) using the following training process. In an epoch, the LATEXT-GAN III 600 uses backpropagation and the text-based discriminator loss function $L_{critic1}$ to train the text-based discriminator neural network 604 and the decoder neural network 610, which is evaluated by solving the following optimization problem.

$$L_{critic1}=\min_{(w_1,\psi)}(-E_{(\tilde{x})\sim P_{\tilde{x}}}[f_{w_1}{}^t(\tilde{x})]+E_{(\hat{x})\sim P_{\hat{x}}}[f_{w_1}{}^t(\hat{x})]+\lambda_1 E_{\bar{x}\sim P_{\bar{x}}}[(\|\nabla_{(\bar{x})}f_{w_1}{}^t(\bar{x})\|_2-1)^2]) \quad \text{Formula (9):}$$

Here, $\tilde{x}$ is the soft-text. $\hat{x}$ is the softmax representation of artificial text. $\bar{x}$ denotes random samples obtained by sampling uniformly along a line connecting pairs of softmax representation of artificial text and real text. $\lambda_1$ is a gradient penalty coefficient. $w_1$ denotes the neural network parameters of the text-based discriminator neural network 604. $\psi$ denotes the neural network parameters of the decoder neural network 610.

The LATEXT-GAN III 600, in the same epoch, uses backpropagation and the code-based discriminator loss $L_{critic2}$ function to train the code-based discriminator neural network 605, which is evaluated by solving the following optimization problem.

$$L_{critic2}=\min_{w_2}(E_{c\sim P_c}[f_{w_2}{}^c(c)]-E_{z\sim P_z}[f_{w_2}{}^c(z)]+\lambda_2 E_{\bar{c1}\sim P}[(\|\nabla_{(\bar{c1})}f_{w_2}{}^c(\bar{c1})\|_2-1)^2]) \quad \text{Formula (10):}$$

Here, z is the random noise data. $\bar{c1}$ is random latent code samples obtained by sampling uniformly along a line connecting pairs of the random noise data and the latent representation of the real text. $\lambda_2$ is a gradient penalty coefficient. $w_2$ denotes the neural network parameters of the code-based discriminator neural network 605.

The LATEXT-GAN III 600, in the same epoch, also uses backpropagation and the generator loss function $L_{Gen-AAE-mul}$ to train the encoder neural network 608 and the decoder neural network 610 by solving the following optimization problem.

$$L_{Gen-AAE-mul}=\min_{\varphi,\psi}(-E_{\tilde{x}\sim P_{\tilde{x}}}[f_{w_1}{}^t(\tilde{x})]+E_{(\hat{x})\sim P_{\hat{x}}}[f_{w_1}{}^t(\hat{x})]+E_{z\sim P_z}[f_{w_2}{}^c(z)]-E_{c\sim P_c}[f_{w_2}{}^c(c)]) \quad \text{Formula (11):}$$

Here, $\hat{x}$ is the softmax representation of artificial text. c is the latent representation of the real text. $\tilde{x}$ is the soft-text. $\varphi$ denotes the neural network parameters of the encoder neural network 608. $\psi$ denotes the neural network parameters of the decoder neural network 610.

The training process is repeated for several epochs until the LATENT GAN III 600 is trained (e.g., the neural network parameters of the encoder neural network 608, the neural network parameters $\psi$ of the decoder neural network 610, the neural network parameters $w_1$ of the text-based discriminator neural network 604, and the neural network parameters $w_2$ of the code-based discriminator neural network 605) are learned. After the LATENT GAN III 600 is trained, a random generator (not used) may be used to generate random noise data which is decoded by the decoder neural network 510B and softmax operator 512B to generate artificial samples (e.g. softmax representations of artificial text ($\hat{x}$)) that mimic the real samples (e.g., the reconstructed softmax representation of real text ($\tilde{x}$).). The artificial samples (e.g., softmax representations of artificial text ($\hat{x}$)) may be decoded to generate one-hot representations of the text using the K-word natural language dictionary. The one-hot representations of text may be converted into text and output for display on an output device 1016 (FIG. 10), such as output device 1016 (FIG. 10) of the processing system 1000 (FIG. 10) described below.

The LATEXT-GANs I, II, III 400, 500, or 600 in FIGS. 4-6 may define the encoder and decoder neural networks for the autoencoder. These networks may be the long short term memory (LSTM) networks.

The decoder neural networks 410, 510, 610 are shared as described above. The LATEXT-GANs may also define generator and discriminator neural network(s). These networks may be a stack of convolutional neural network (CNN) layers.

The LATEXT GANs 400, 500, 600 may derive the graph in TensorFlow. TensorFlow is an open-source software library for dataflow programming across a range of tasks. TensorFlow is a symbolic math library. TensorFlow can be used for machine learning applications such as neural networks.

The LATEXT-GANs 400, 500, 600 may define the loss function for the autoencoder, which is a mean-squared difference of the one-hot representations of the real text and the reconstructed output from the decoder neural networks 410, 510, 610. The LATEXT-GANs 400, 500, 600 may also define the gradient penalty loss function for the generator 402, 502, 602 and discriminator neural networks 404, 504, 604. In addition, the LATEXT-GANs 400, 500, 600 may define Adam optimizers for the autoencoder 420, 520, 620, the generator neural network(s) 402, 502, and the discriminator neural network(s) 404, 504, 505, 604, 605. Adam optimization is an optimization algorithm that can be used instead of the classical stochastic gradient descent procedure to learn the neural network parameters of all the neural networks iteratively.

For training, the LATEXT-GANs 400, 500, 600 first initialize all TensorFlow variables (e.g., variables for loss functions, network parameters, and placeholder variables) for the generator neural network, the discriminator neural network(s), the encoder neural network, and the decoder neural network. Then, for a number of training iterations, the LATEXT-GANs 400, 500, 600 may train the autoencoder (i.e., the encoder neural network 408, 508, 608 and the decoder neural network 410, 510, 610) to learn the neural network parameters $\varphi$ and $\psi$ and for reconstructing the real text train the discriminator neural network(s) for k times to learn the neural network parameters w for LATENT GAN I 400, and to learn the neural network parameters $w_1$ and $w_2$ for LATENT-GANs II 500, 600, and perform additional training.

To train the autoencoder 420, 520, 620, the LATEXT-GANs 400, 500, 600 receives one-hot representations of real text $\{x^i\}_{i=1}^m \sim P_x$, computes latent representations $c^i = enc_\varphi(x^i)$, reconstructs a representation of the real text, and applies a softmax function to the reconstructed representation of the real text to generate a reconstructed softmax representation of the real text (e.g., soft-text) $\{\tilde{x}^i\}_{i=1}^m$. The LATEXT-GANs 400, 500, 600 then use backpropagation and the reconstruction loss $L_{AE}(\varphi,\psi)$ to update the neural network parameters $\varphi$ of the encoder neural network 408, 508, 608 and the neural network parameters $\psi$ of the decoder neural network 410, 510, 610.

To train the discriminator neural network(s) k times, the LATEXT-GANs receives random noise variables $\{z^i\}_{i=1}^m \sim N(0, I)$ and generates a representation of an artificial sample based on the random noise variables. The LATEXT-GANs 400, 500, 600 also computes a representation of artificial text, and applies a softmax function to the representation of the artificial text to generate a softmax representation of the artificial text $\{\hat{x}^i\}_{i=1}^m \sim G_\theta(z)$. For the LATEXT-GAN I 400, the LATEXT-GAN I backpropagates the discriminator loss based on the Wasserstein GAN-Gradient penalty (WGAN-GP) to update the neural network parameters w of the discriminator neural network. For the LATEXT-GAN II 500, the LATEXT-GAN II backpropagates the text-based and the code-based discriminator losses to update the neural networks parameters $w_1$ and $w_2$ of the text-based and the code-based neural networks. For the LATEXT-GAN III 600, the LATEXT-GAN III backpropagates the text-based and code-based discriminators losses to update the neural network parameters $w_1$ and $w_2$ of the text-based and code-based neural networks.

To perform additional training, the LATEXT-GANs samples $\{x^i\}_{i=1}^m \sim P_x$ and sample $\{z^i\}_{i=1}^m \sim N(0, I)$. For the LATEXT-GAN I 400, the LATEXT-GAN I may backpropagate the discriminator loss to update the neural network parameters $\varphi$ of the encoder neural network 408 and the neural network parameters $\psi$ of the decoder neural network 410 The LATEXT-GAN I also backpropagate the generator loss to update the neural network parameters $\theta$ of the generator neural network 402 and the neural network parameters $\psi$ of the decoder neural network 410.

For the LATEXT-GAN II 500, the LATEXT-GAN II backpropagates the text-based discriminator loss to update the neural network parameter $\psi$ of the decoder neural network 510. The LATEXT-GAN II also backpropagate the code-based discriminator loss to update the neural network parameters of the encoder neural network 508. The LATEXT-GAN II further backpropagate the generator loss to update the neural network parameters $\theta$ of the generator neural network 502 and the neural network parameters $\psi$ of the decoder neural network 510.

For the LATEXT-GAN III 600, the LATEXT-GAN III backpropagates the text-based discriminator loss to update the neural network parameters $\psi$ of the decoder neural network 610. The LATEXT-GAN III also backpropagate the generator loss $L_{Gen-AAE-mul}$ to update the neural network parameters $\varphi$ of the encoder neural network 608 and the neural network $\psi$ parameters decoder neural networks, respectively.

Figure 10:
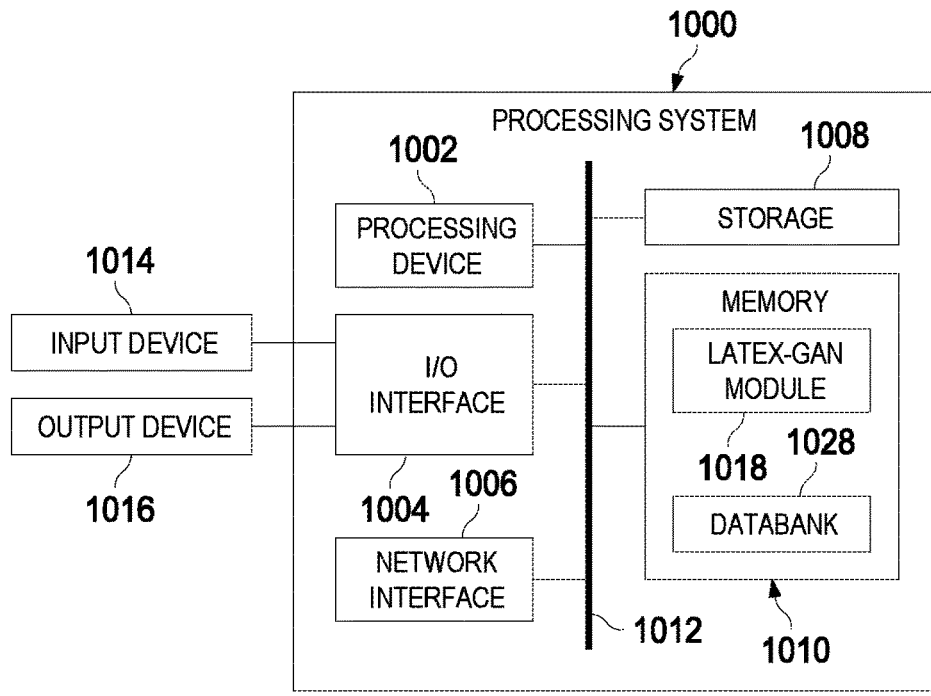
FIG. 10 is a block diagram of a processing system that can be used to implement the LATEXT-GANs, according to example embodiments.
Figure 7:
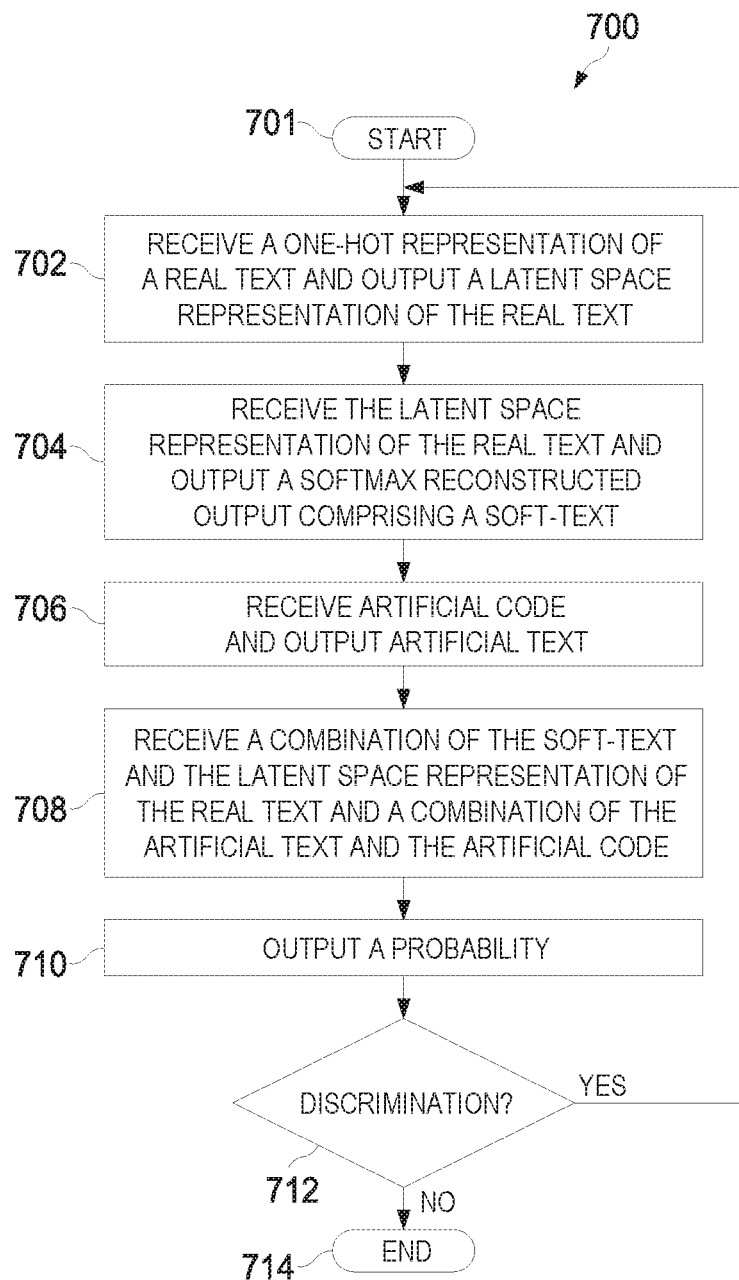
FIG. 7 illustrates a flowchart of a method for raining a LATEXT-GAN I for text generation, according to some embodiments.

FIG. 7 illustrates a flowchart of a method 700 for training a latent space and text-based generative adversarial network (LATEXT-GAN) for text generation, according to some embodiments. The method 700 may be carried out or performed by the LATEXT-GAN I, such as the LATEXT-GAN I 400, which includes computer-readable code or instructions executing on one or more processing devices of a processing system, such as processing devices 1000 (FIG. 10) of the processing unit 1000 (FIG. 10). Coding of the software for carrying out or performing the method 700 is well within the scope of a person of ordinary skill in the art having regard to the present disclosure. The method 700 may include additional or fewer operations than those shown and described and may be carried out or performed in a different order. Computer-readable code or instructions of the software executable by the one or more processing units may be stored on a non-transitory computer-readable medium, such as for example, the memory of a computing device.

The method 700 starts at the operation 701 where the neural network parameters φ, ψ, θ, and w of the encoder neural network 408, the decoder neural network 410, the generator neural network 402, and the hybrid discriminator neural network 404, respectively are initialized, and proceeds to the operation 702, where an encoder neural network 408 receives a one-hot representation of a real text. The real text comprises a sequence of words. The encoder neural network 408 outputs a latent representation of the real text generated from the one-hot representation of the real text.

At the operation 704, the decoder neural network 410B receives the latent representation of the real text. The decoder neural network 410B outputs a reconstructed representation of the real text generated from the latent representation of the real text. A softmax operator 412A performs a softmax function of the output of the decoder neural network 410A to generate a reconstructed softmax representation of the real text. The reconstructed softmax representation of the real text (e.g., a soft-text) is a continuous representation of the real text At the operation 706, the decoder neural network 410B receives artificial code generated by a generator neural network 402 of the GAN (e.g., the generator neural network 402 and the hybrid discriminator neural network 404) from random noise data. The decoder neural network 410 outputs softmax representation of artificial text generated from the artificial code.

At the operation 708, the hybrid discriminator neural network 404 receives a combination of the soft-text and the latent representation of the real text and a combination of the softmax representation of artificial text and the artificial code. The combination of the soft-text and the latent representation of the real text comprise a concatenation of the soft-text and the latent representation of the real text. The combination of the softmax representation of artificial text and the artificial code comprises a concatenation of the softmax representation of artificial text and the artificial code.

At the operation 710, the hybrid discriminator neural network 404 outputs a probability indicating whether the combination of the softmax representation of artificial text and the artificial code received by the hybrid discriminator neural network 404 is similar to the combination of the soft-text and the latent representation of the real text.

The LATEXT-GAN I 400 calculates a reconstruction loss for the autoencoder 420 based on a difference between the one-hot representation of the real text and the soft-text output from the decoder neural network 410. The LATEXT-GAN I 400 uses backpropagation and a reconstruction loss function $L_{AE}(\varphi, \psi)$ to update the neural network parameters φ of the encoder neural network 408 and the neural network parameters ψ of the decoder neural network 410. In one embodiment, the LATEXT-GAN 400 may solve the following optimization problem $$L_{AE}(\varphi, \psi) = \min_{(\varphi, \psi)}(\|x - \text{softmax}(dec_\psi(enc_\varphi(x)))\|^2)$$

to minimize the reconstruction loss for the autoencoder 420. Here, x denotes the one-hot representation of the real text. φ denotes the neural network parameters of the encoder neural network 408. ψ denotes the neural network parameters of the decoder neural network 410.

The LATEXT-GAN I 400 calculates a discriminator loss based on the soft-text, the artificial code, the softmax representation of artificial text, and the latent representation of the real text. The LATEXT-GAN I 400 uses backpropagation and a discriminator loss function $L_{critic-ALI}$ to update the neural network parameters w of the hybrid discriminator neural network, the neural network parameters φ of the encoder neural network 408, and the neural network parameters ψ of the decoder neural network based on the discriminator loss. In one embodiment, the LATEXT-GAN I may solve the following optimization problem $$L_{critic-ALI} = \min_{(w,\varphi,\psi)} \Big( -E_{(\tilde{x},c) \sim P_{\tilde{x}} P_c}[f_w^{t+c}(\tilde{x}, c)] + \\ E_{(\hat{x},\hat{c}) \sim P_{\hat{x}} P_{\hat{c}}}[f_w^{t+c}(\hat{x}, \hat{c})] + \lambda E_{(\overline{x},\overline{c}) \sim P_{\overline{x}} P_{\overline{c}}}[(\|\nabla_{(\overline{x},\overline{c})} f_w^{t+c}(\overline{x}, \overline{c})\|_2 - 1)^2]\Big)$$

to minimize the discriminator loss. Here, x̃ denotes the soft-text. ĉ denotes the artificial code. x̂ denotes the softmax representation of artificial text. c denotes the latent representation of the real text. x̄ denotes random samples obtained by sampling uniformly along a line connecting pairs of generated and soft-text samples. c̄ denotes random latent code samples obtained by sampling uniformly along a line connecting pairs of the artificial code and the latent representation of the real text. λ denotes a gradient penalty coefficient, w denotes the neural network parameters of the hybrid discriminator neural network 404, φ denotes neural network parameters of the encoder neural network 408, and ψ denotes neural network parameters of the decoder neural network 410.

The LATEXT-GAN I 400 calculates a generator loss that maximizes the probability output by the hybrid discriminator neural network 404. The LATEXT-GAN I 400 uses backpropagation and a generator loss function $L_{Gen-ALI}$ to update the neural network parameters θ of the generator neural network 402 and the neural network parameters ψ of the decoder neural network 410. In one embodiment, the LATEXT-GAN I 400 solves the following optimization problem $$L_{Gen-ALI} = \min_{(\theta, \psi)} (+E_{(\hat{x},\hat{c}) \sim P_{\hat{x}} P_{\hat{c}}}[f_w^{t+c}(\hat{x},\hat{c})] + E_{(\tilde{x},c) \sim P_{\tilde{x}} P_c}[f_w^{t+c}(\tilde{x},c)])$$

to minimize the generator loss. Here, x̂ denotes the softmax representation of artificial text. c denotes the latent space representation of the real text. x̃ denotes the soft-text. ĉ denotes the artificial code. θ denotes the neural network parameters of the generator neural network 402. ψ denotes the neural network parameters of the decoder neural network 410.

At the operation 712, the LATEXT-GAN I 400 determines whether the combination of the soft-text and the latent representation of the real text can be discriminated with the combination of the artificial text and the artificial code by the hybrid discriminator neural network. If so, the LATEXT-GAN I 400 further perform the training by repeating the operations 702-710. Otherwise, the neural network parameters neural network parameters φ, ψ, θ, and w of the encoder neural network 408, the decoder neural network 410, the generator neural network 402, and the hybrid discriminator neural network 404 are learned and the LATENT-GAN I 400 may be used to generate artificial text that mimics real text. The method 700 ends at the operation 714.

Figure 8:
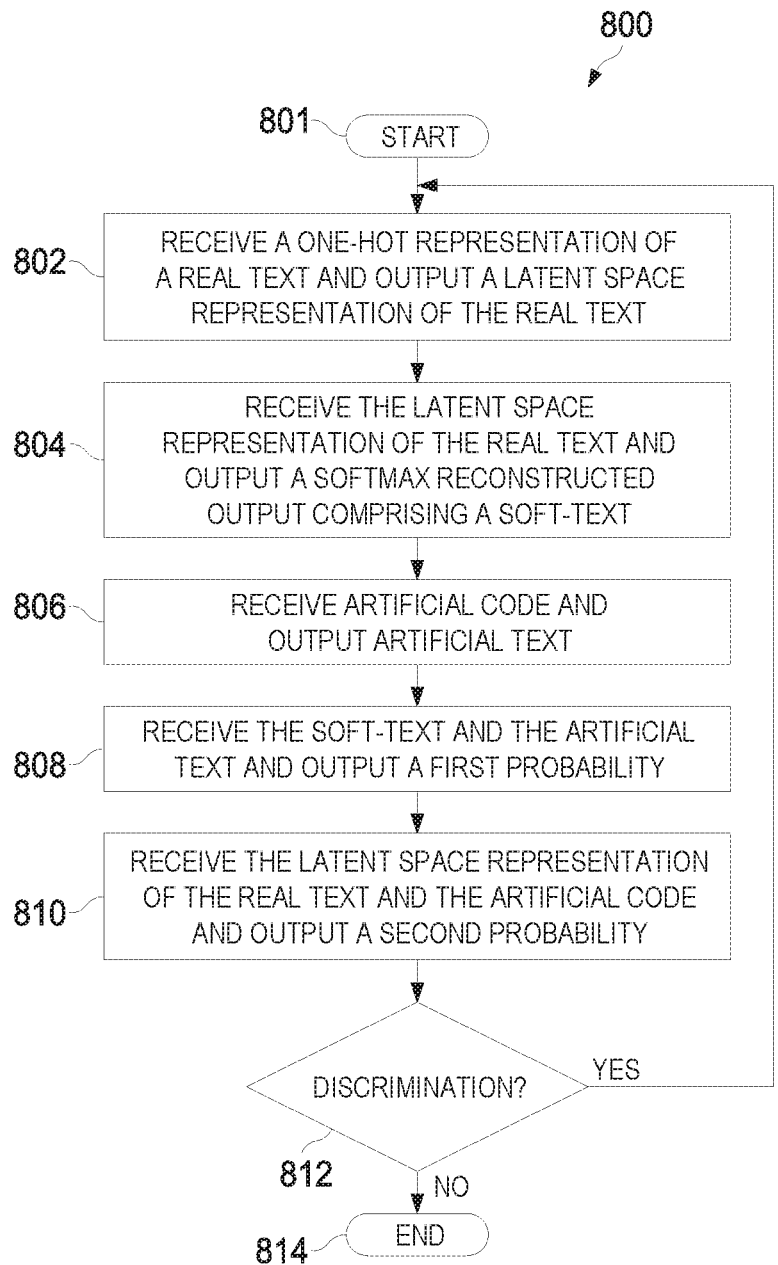
FIG. 8 illustrates a flowchart of a method for training a LATEXT-GAN II for text generation, according to some embodiments.

FIG. 8 illustrates a flowchart of a method 800 for training a latent space and text-based generative adversarial network (LATEXT-GAN) for text generation, according to some embodiments. The method 800 may be carried out or performed by the LATEXT-GAN II 500, which includes computer-readable code or instructions executing on one or more processing devices of a processing system, such as processing devices 1000 (FIG. 10) of the processing unit 1000 (FIG. 10). The method 800 may further be carried out or performed by a combination of hardware and software. Coding of the software for carrying out or performing the method 800 is well within the scope of a person of ordinary skill in the art having regard to the present disclosure. The method 800 may include additional or fewer operations than those shown and described and may be carried out or performed in a different order. Computer-readable code or instructions of the software executable by the one or more processing units may be stored on a non-transitory computer-readable medium, such as for example, the memory of a computing device.

Method 800 starts at the operation 801 where the neural network parameters φ, ψ, θ, w₁ and w₂ of the encoder neural network 508, the decoder neural network 510, the generator neural network 502, and the text-based discriminator neural network 504 and the code-based discriminator neural network 505, respectively are initialized and proceeds to the operation 802, where an encoder neural network 508 receives a one-hot representation of a real text. The real text comprising a sequence of words. The encoder neural network 508 outputs a latent representation of the real text generated from the one-hot representation of the real text.

At the operation 804, the decoder neural network 510A receives the latent representation of the real text. The decoder neural network 510A outputs a reconstructed representation of the real text generated from the latent representation of the real text. The softmax operator 512A performs a softmax function on the reconstructed representation of the real text to generate a reconstructed softmax representation of the real text. The reconstructed softmax representation of the real text (e.g. a soft-text) is a continuous representation of the real text.

At the operation 806, the decoder neural network 510B receives artificial code generated by a generator neural network 502 from random noise data. The decoder neural network 510B outputs softmax representation of artificial text generated from the artificial code.

At the operation 808, a first discriminator neural network (e.g., a text-based discriminator neural network 504) receives the soft-text and the softmax representation of artificial text. The text-based discriminator neural network 504 outputs a first probability indicating whether the softmax representation of artificial text received by the text-based discriminator neural network 504 is similar to the soft-text.

At the operation 810, a second discriminator neural network (e.g., a code-based discriminator neural network 505) receives the latent representation of the real text and the artificial code. The text-based discriminator neural network 505 outputs a second probability indicating whether the artificial code received by the text-based discriminator neural network 505 is similar to the latent representation of the real text.

The LATEXT-GAN II 500 calculates a reconstruction loss for the autoencoder 520 based on a difference between the one-hot representation of the real text and the soft-text output from the autoencoder 420. The LATEXT-GAN II 500 uses backpropagation and a reconstruction loss function $L_{AE}(\varphi,\psi)$ to update the neural network parameters φ of the encoder neural network 508 and the neural network parameters ψ of the decoder neural network 510 based on the reconstruction loss. In one embodiment, the LATEXT-GAN II 500 solves the following optimization problem $$L_{AE}(\varphi,\psi)=\min_{(\varphi,\psi)}(\|x-\text{softmax}(\text{dec}_\psi(\text{enc}_\varphi(x)))\|^2)$$

to minimize the reconstruction loss. Here, x denotes the one-hot representation of the real text. φ denotes the neural network parameters of the encoder neural network 508. ψ denotes the neural network parameters of the decoder neural network 510.

The LATEXT-GAN II 500 calculates a first discriminator loss for the text-based discriminator neural network 504 based on the soft-text and the softmax representation of artificial text. The LATEXT-GAN II 500 uses backpropagation and a first discriminator loss function ψ to update the neural network parameter $w_1$ of the text-based discriminator neural network 504 and the neural network parameters ψ of the decoder neural network 510. In one embodiment, the LATEXT-GAN II 500 solves the following optimization problem.

$$L_{critic1}=\min_{(w_1,\psi)}(-E_{(\tilde{x})-P_{\tilde{x}}}[f_{w_1}'(\tilde{x})]+E_{(\hat{x})-P_{\hat{x}}}[f_{w_1}'(\hat{x})]+\lambda_1 E_{\bar{x}-P_{\bar{x}}}[(\|\nabla_{\bar{x}}f_{w_1}'(\bar{x})\|_2-1)^2])$$

to minimize the first discriminator loss. Here, $\tilde{x}$ denotes the soft-text. $\hat{x}$ denotes the softmax representation of artificial text. $\bar{x}$ denotes random samples obtained by sampling uniformly along a line connecting pairs of softmax representation of artificial text and real text. $\lambda_1$ denotes a gradient penalty coefficient. $w_1$ denotes the neural network parameters of the text-based discriminator neural network 504. ψ denotes the neural network parameters of the decoder neural network.

The LATEXT-GAN II 500 calculates a second discriminator loss for the code-based discriminator neural network 504 based on the artificial code and the latent representation of the real text. The LATEXT-GAN II 500 uses backpropagation and a second discriminator loss function $L_{critic2}$ to update the neural network parameters $w_2$ of the code-based discriminator neural network 505 and the neural network parameters φ of the encoder neural network 505. In one embodiment, the LATEXT-GAN II 500 solves the following optimization problem.

$$L_{critic2}=\min_{(w_2,\varphi)}(E_{\hat{c}-P_{\hat{c}}}[f_{w_2}^c(\hat{c})]-E_{c-P_c}[f_{w_2}^c(c)]+\lambda_2 E_{\bar{c}-P_{\bar{c}}}[(\|\nabla_{\bar{c}}f_{w_2}^c(\bar{c})\|_2-1)^2])$$

to minimize second discriminator loss. Here, c denotes the latent representation of the real text. $\hat{c}$ denotes the artificial code. $\bar{c}$ denotes random latent code samples obtained by sampling uniformly along a line connecting pairs of the artificial code and the latent space representation of the real text. $\lambda_2$ denotes a gradient penalty coefficient. $w_2$ denotes neural network parameters of the second discriminator neural network. φ denotes neural network parameters of the encoder neural network.

The LATEXT-GAN II 500 calculates a generator loss that maximizes the first probability and the second probability. The LATEXT-GAN II 500 uses backpropagation and a generator loss function to update the neural network parameters θ of the generator neural network and the neural network parameters ψ of the decoder neural network based on the generator loss. In one embodiment, the LATEXT-GAN II solves the following optimization problem $$\min_{(\theta,\psi)}(-E_{\tilde{x}-P_{\tilde{x}}}[f_{w_1}'(\tilde{x})]+E_{(\hat{x})-P_{\hat{x}}}[f_{w_1}'(\hat{x})]-E_{\hat{c}-P_{\hat{c}}}[f_{w_2}^c(\hat{c})]+E_{c-P_c}[f_{w_2}^c(c)])$$

To minimize the generator loss. Here, x̂ denotes the softmax representation of artificial text. c denotes the latent space representation of the real text. ĉ denotes the artificial code. x̃ denotes the soft-text. θ denotes parameters of the generator neural network. ψ denotes parameters of the decoder neural network.

At the operation 812, the LATEXT-GAN II 500 determines a first condition of whether the soft-text and the softmax representation of artificial text can be discriminated by the first discriminator neural network. The LATEXT-GAN II 500 determines a second condition of whether the latent representation of the real text and the artificial code can be discriminated by the second discriminator neural network. In one embodiment, if at least one of the two conditions is satisfied, the LATEXT-GAN II 500 further perform the training by repeating the operations 802-810. Otherwise, the method 800 ends at the operation 814. In another embodiment, if both of the two conditions are satisfied, the LATEXT-GAN II may further perform the training by repeating the operations 802-810. Otherwise, the neural network parameters neural network parameters $\varphi$, $\psi$, $\theta$, $w_1$ and $w_2$ of the encoder neural network 508, the decoder neural network 510, the generator neural network 502, and the text-based discriminator neural network 504, and the code-based discriminator network 505 are learned and the LATENT-GAN II 500 may be used to generate artificial text that mimics real text and method 800 ends at the operation 814.

Figure 9:
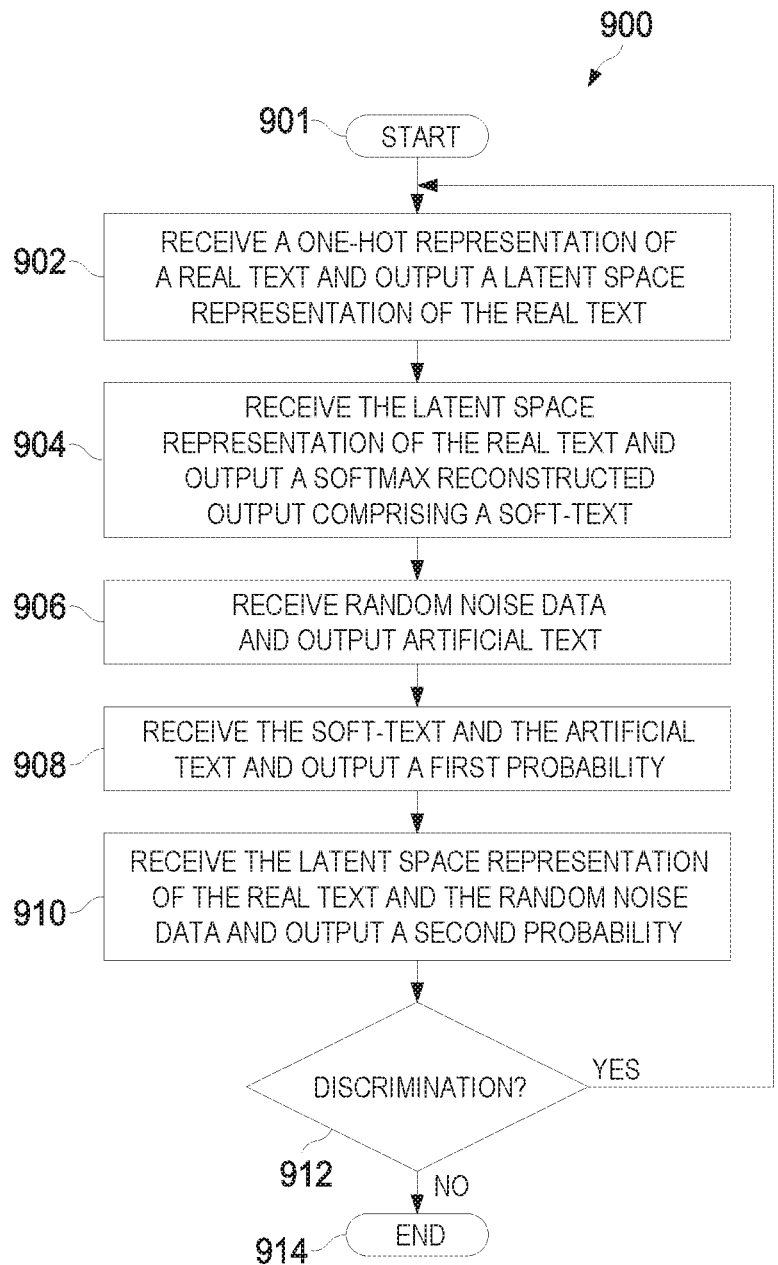
FIG. 9 illustrates a flowchart of a method for training a LATEXT-GAN III for text generation, according to some embodiments.

FIG. 9 illustrates a flowchart of a method 900 for training a latent space and text-based generative adversarial network (LATEXT-GAN) for text generation, according to some additional embodiments. The method 900 may be carried out or performed by the LATEXT-GAN III, such as the LATEXT-GAN III 600 in FIG. 6, which includes computer-readable code or instructions executing on one or more processing devices of a processing system, such as processing devices 1000 (FIG. 10) of the processing unit 1000 (FIG. 10). The method 900 may also be carried out or performed by routines, subroutines, or modules of software executed by the one or more processing units. The method 900 may further be carried out or performed by a combination of hardware and software. Coding of the software for carrying out or performing the method 900 is well within the scope of a person of ordinary skill in the art having regard to the present disclosure. The method 900 may include additional or fewer operations than those shown and described and may be carried out or performed in a different order. Computer-readable code or instructions of the software executable by the one or more processing units may be stored on a non-transitory computer-readable medium, such as for example, the memory of a computing device.

Method 900 starts at the operation 901, where the neural network parameters $\varphi$, $\psi$, $\theta$, $w_1$ and $w_2$ of the encoder neural network 608, the decoder neural network 610, and the text-based discriminator neural network 604 and the code-based discriminator neural network 605, respectively are initialized and proceeds to the operation 902, where the encoder neural network 608 receives a one-hot representation of a real text. The real text comprising a sequence of words. The encoder neural network 608 outputs a latent representation of the real text generated from the one-hot representation of the real text.

At the operation 904, the decoder neural network 610A receives the latent representation of the real text. The decoder neural network outputs a reconstructed representation of the real text generated from the latent representation of the real text. The autoencoder 420 outputs the reconstructed softmax representation of the real text comprising a soft-text that is a continuous representation of the real text.

At the operation 906, the decoder neural network 610B receives random noise data. The decoder neural network 610B outputs representation of artificial text generated from the random noise data to the softmax operator 612B, which performs a softmax function on the representation of artificial text and outputs a softmax representation of artificial text.

At the operation 908, a first discriminator neural network (e.g., a text-based discriminator neural network 604) receives the soft-text and the softmax representation of artificial text. The text-based discriminator neural network 604 outputs a first probability indicating whether the softmax representation of artificial text received by the text-based discriminator neural network 604 is similar to the soft-text.

At the operation 910, a second discriminator neural network (e.g., a code-based discriminator neural network 605) receives the latent representation of the real text and the random noise data. The code-based discriminator neural network outputs a second probability indicating whether the random noise data received by the text-based discriminator neural network 605 is similar to the latent representation of the real text.

The LATEXT-GAN III 600 calculate a reconstruction loss for an autoencoder based on a difference between the one-hot representation of the real text and the soft-text output from the decoder neural network. The LATEXT-GAN III 600 also uses backpropagation and a reconstruction loss function $L_{AE}(\varphi,\psi)$=to update the neural network parameters. $\varphi$ of the encoder neural network 408 and the neural network parameters $\psi$ of the decoder neural network 610. In one embodiment, the LATEXT-GAN III solves the following optimization problem $$L_{AE}(\varphi,\psi)=\min_{(\varphi,\psi)}(\|x-\text{softmax}(\text{dec}_\psi(\text{enc}_\varphi(x)))\|^2)$$

to minimize the reconstruction loss. Here, x denotes the one-hot representation of the real text. $\varphi$ denotes parameters of the encoder neural network. $\psi$ denotes parameters of the decoder neural network.

The LATEXT-GAN III 600 calculates a first discriminator loss for the text-based discriminator neural network 604 based on the soft-text and the softmax representation of artificial text. The LATEXT-GAN III 600 uses backpropagation and the first discriminator loss function $L_{critic1}$ to update the neural network parameters $w_1$ of the text-based discriminator neural network and the neural network parameters $\psi$ of the decoder neural network 610. In one embodiment, the LATEXT-GAN III 600 solves the following optimization problem $$\min_{(w_{1,\psi})}(-E_{(\tilde{x})\sim P_{\tilde{x}}}[f_{w_1}{}'(\tilde{x})]+E_{(\hat{x})\sim P_{\hat{x}}}[f_{w_1}{}'(\hat{x})]+\lambda_1 E_{\bar{x}\sim P}$$
$$_{\bar{x}}[(\|\nabla_{\bar{x}}f_{w_1}{}'(\bar{x})\|_2-1)^2])$$

minimize the first discriminator loss. Here, x̃ denotes the soft-text. x̂ denotes the softmax representation of artificial text. x̄ denotes random samples obtained by sampling uniformly along a line connecting pairs of softmax representation of artificial text and real text. $\lambda_1$ denotes a gradient penalty coefficient, $w_1$ denotes the neural network parameters of the first discriminator neural network. $\psi$ denotes the neural network parameters of the decoder neural network.

The LATEXT-GAN III calculates a second discriminator loss for the code-based discriminator neural network 605 based on the random noise data and the latent representation of the real text. The LATEXT-GAN III 600 uses backpropagation and the second discriminator loss function $L_{critic2}$ update the neural network parameters $w_2$ of the code-based discriminator neural network 605. In one embodiment, the LATEXT-GAN solves the following optimization problem $$L_{critic2} = \min_{w_2}(E_{c \sim P_c}[f_{w_2}^c(c)] - E_{z \sim P_z}[f_{w_2}^c(z)] + \lambda_2 E_{\bar{c1} \sim P}$$
$$\bar{c1}[(\|\nabla_{\bar{c1}} f_{w_2}^c(\bar{c1})\|_2 - 1)^2])$$

to minimize the second discriminator loss. Here, z denotes the random noise data. $\bar{c1}$ denotes random latent code samples obtained by sampling uniformly along a line connecting pairs of the random noise data and the latent space representation of the real text. $\lambda_2$ denotes a gradient penalty coefficient $w_2$ denotes parameters of the second discriminator neural network.

The LATEXT-GAN III 600 calculates a generator loss that maximizes the first probability and the second probability. The LATEXT-GAN III uses backpropagation and a generator loss function $L_{Gen-AAE-mul}$ to update the neural network parameters $\varphi$ of the encoder neural network 608 and the neural network parameters $\psi$ the decoder neural network 610. In one embodiment, the LATEXT-GAN III solves the following optimization problem.

$$L_{Gen-AAE-mul} = \min_{\varphi, \psi}(-E_{\tilde{x} \sim P_{\tilde{x}}}[f_{w_1}^t(\tilde{x})] + E_{(\tilde{x}) \sim P_{\tilde{x}}}[f_{w_1}^t(\tilde{x})] +$$
$$E_{z \sim P_z}[f_{w_2}^c(z)] - E_{c \sim P_c}[f_{w_2}^c(c)])$$

to minimize the generator loss Here, $\hat{x}$ denotes the softmax representation of artificial text. c denotes the latent representation of the real text. $\tilde{x}$ denotes the soft-text. $\varphi$ denotes the neural network parameters of the encoder neural network. $\psi$ denotes the neural network parameters of the decoder neural network.

At the operation 912, the LATEXT-GAN III 600 determines a first condition of whether the soft-text and the softmax representation of artificial text can be discriminated by the first discriminator neural network. The LATEXT-GAN III 600 determines a second condition of whether the latent space representation of the real text and the random noise data can be discriminated by the second discriminator neural network. In one embodiment, if at least one of the two conditions is satisfied, the LATEXT-GAN III 600 may further perform the training by repeating the operations 902-910. Otherwise, the neural network parameters neural network parameters $\varphi, \psi, \theta, w_1$ and $w_2$ of the encoder neural network 508, the decoder neural network 510, and the text-based discriminator neural network 504, and the code-based discriminator network 505 are learned and the LATENT-GAN III 600 may be used to generate artificial text that mimics real text and the method 900 ends at the operation 914. In another embodiment, if both of the two conditions are satisfied, the LATEXT-GAN III may further perform the training by repeating the operations 902-910. Otherwise, the method 900 ends at the operation 814.

In sum, embodiments of this disclosure address the main bottleneck of text generation using a GAN in dealing with discrete data and provide three embodiment approaches of using the latent code and the soft-text in the GAN training. The combined code-based and text-based discriminator(s) become more powerful than the discriminators in the traditional approaches. The generator also becomes more successful in fooling the discriminator(s) than the generators in the traditional approaches. Consequently, after the adversarial training between the generator and the discriminator(s), the softmax representation of artificial text samples generated by the generator would be more realistic than the softmax representation of artificial text samples generated by the generators of the conventional systems.

The disclosed techniques result in better performance for generating more accurate artificial text samples than conventional techniques. More realistic and more understandable texts can be produced by the generator of the GAN using the disclosed techniques.

The disclosed techniques in the embodiments of this disclosure can be applied to other technical areas. The disclosed techniques can be applied directly to other applications such as bilingual machine translation (or the Bilingual GAN) and generating conversations.

The disclosed techniques can be applied to text-to-text generation systems, such as machine translation, dialog models, chatbots, and question answering, etc. For example, the disclosed techniques can be employed in natural language processing (NLP) related applications.

The disclosed techniques can be applied to summarization applications where textual summaries of the data set are generated. Examples of such applications include, but are not limited to, producing textual weather forecasts from weather data, summarizing financial and business data, summarizing electronic medical records, and describing graphs and data sets to blind people, etc.

FIG. 10 is a block diagram of an example simplified processing system 1000, which may be used to implement embodiments disclosed herein, and provides a higher level implementation example. The LATEXT GANs I, II, and III 400, 500, and 600 of FIGS. 4-6 and the methods 700, 800, and 900 of FIGS. 7-9 may be implemented using the example processing system 1000, or variations of the processing system 1000. The processing system 1000 could be a server or a desktop terminal, for example, or any suitable processing system. Other processing systems suitable for implementing embodiments described in the present disclosure may be used, which may include components different from those discussed below. Although FIG. 10 shows a single instance of each component, there may be multiple instances of each component in the processing system 1000.

The processing system 1000 may include one or more processing devices 1002, such as a processor, graphics processing unit (GPU), a microprocessor, an application-specific integrated circuit (ASIC), a field-programmable gate array (FPGA), a dedicated logic circuitry, a tensor processing units (TPU), an artificial intelligence (AI) accelerator, or combinations thereof. The processing system 1000 may also include one or more input/output (I/O) interfaces 1004, which may enable interfacing with one or more appropriate input devices 1014 and/or output devices 1016. The processing system 1000 may include one or more network interfaces 1006 for wired or wireless communication with a network (e.g., an intranet, the Internet, a P2P network, a WAN and/or a LAN) or other node. The network interfaces 1006 may include wired links (e.g., Ethernet cable) and/or wireless links (e.g., one or more antennas) for intra-network and/or inter-network communications.

The processing system 1000 may also include one or more storage units 1008, which may include a mass storage unit such as a solid state drive, a hard disk drive, a magnetic disk drive and/or an optical disk drive. The processing system 1000 may include one or more memories 1010, which may include a volatile or non-volatile memory (e.g., a flash memory, a random access memory (RAM), and/or a read-only memory (ROM)). The non-transitory memory(ies) 1010 may store instructions for execution by the processing device(s) 1002, such as to carry out examples described in the present disclosure, for example to perform encoding or decoding. The memory(ies) 1010 may include other software instructions, such as for implementing an operating system and other applications/functions. In some examples, one or more data sets and/or modules may be provided by an external memory (e.g., an external drive in wired or wireless communication with the processing system 1000) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. There may be a bus 1012 providing communication among components of the processing system 1000, including the processing device(s) 1002, I/O interface(s) 1004, network interface(s) 1006, storage unit(s) 1008, and/or memory(ies) 1010. The bus 1012 may be any suitable bus architecture including, for example, a memory bus, a peripheral bus or a video bus.

In FIG. 10, the input device(s) 1014 (e.g., a keyboard, a mouse, a microphone, a touchscreen, and/or a keypad) and output device(s) 1016 (e.g., a display, a speaker and/or a printer) are shown as external to the processing system 1000. In other examples, one or more of the input device(s) 1014 and/or the output device(s) 1016 may be included as a component of the processing system 1000. In other examples, there may not be any input device(s) 1014 and output device(s) 1016, in which case the I/O interface(s) 1004 may not be needed.

The memory(ies) 1010 may include instructions for a regression module 1018 that, when executed, cause the processing system 1000 to perform a method such as the method 700, 800, and 900 of FIGS. 7-9. The memory(ies) 1010 may further store training dataset (e.g., real text data samples) and generated text data samples in a databank 1028.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for training a latent space and text-based generative adversarial network (GAN), the method comprising:

receiving, at an encoder neural network of the latent space and text-based GAN, one-hot representations of real text and outputting, by the encoder neural network, a latent representation of the real text generated by the encoder neural network from the one-hot representations of the real text, wherein the real text comprises a sequence of words from a K-word natural language dictionary, and wherein the one-hot representations of the real text include a one-hot representation for each word in the sequence of words from the K-word natural language dictionary;

receiving, at a decoder neural network of the latent space and text-based GAN, the latent representation of the real text generated from the one-hot representations of the real text, and outputting, by the decoder neural network, a reconstructed softmax representation of the real text generated by the decoder neural network from the latent representation of the real text, wherein the reconstructed softmax representation of the real text is a continuous representation of the real text;

receiving, at the decoder neural network, an artificial code generated by a generator neural network of the latent space and text-based GAN from random noise data, and outputting, by the decoder neural network, softmax representation of artificial text generated by the decoder neural network from the artificial code;

receiving, at a hybrid discriminator neural network of the latent space and text-based GAN, a first combination of the reconstructed softmax representation of the real text output by the decoder neural network and the latent representation of the real text output by the encoder neural network;

receiving, at the hybrid discriminator neural network, a second combination of the softmax representation of artificial text and the artificial code; and outputting, by the hybrid discriminator neural network, a probability indicating whether the second combination of the softmax representation of artificial text and the artificial code received by the hybrid discriminator neural network is similar to the first combination of the reconstructed softmax representation of the real text and the latent representation of the real text received by the hybrid discriminator neural network.

2. The method of claim 1, wherein the first combination of the reconstructed softmax representation of the real text and the latent representation of the real text comprises a first concatenation of the reconstructed softmax representation of the real text and the latent representation of the real text, and the second combination of the softmax representation of artificial text and the artificial code comprises a second concatenation of the softmax representation of artificial text and the artificial code.

3. The method of claim 1, further comprising:

calculating a reconstruction loss based on a difference between the one-hot representations of the real text and the reconstructed softmax representation of the real text output from the decoder neural network;

updating parameters of the encoder neural network and parameters of the decoder neural network based on the reconstruction loss; and repeating the receiving the one-hot representations of the real text and outputting the latent representation of the real text, the receiving the latent representation of the real text and outputting the reconstructed softmax representation of the real text, the receiving the first combination, the receiving the second combination, the outputting the probability, the calculating the reconstruction loss, and the updating the parameters of the encoder neural network and the parameters of the decoder neural network until the reconstruction loss is minimized.

4. The method of claim 1, further comprising:
calculating a discriminator loss based on the reconstructed softmax representation of the real text, the artificial code, the softmax representation of artificial text, and the latent representation of the real text;
updating parameters of the hybrid discriminator neural network, parameters of the encoder neural network, and parameters of the decoder neural network based on the discriminator loss; and
repeating the receiving the one-hot representations of the real text and outputting the latent representation of the real text, the receiving the latent representation of the real text and outputting the reconstructed softmax representation of the real text, the receiving the first combination, the receiving the second combination, the outputting the probability, the calculating the discriminator loss, and updating the parameters of the hybrid discriminator neural network, the parameters of the encoder neural network, and the parameters of the decoder neural network until the discriminator loss is minimized.

5. The method of claim 1, further comprising:
calculating a generator loss that maximizes the probability output by the hybrid discriminator neural network based on a concatenation of the softmax representation of artificial text and the artificial code;
updating parameters of the generator neural network and parameters of the decoder neural network based on the generator loss; and
repeating the receiving the one-hot representations of the real text and outputting the latent representation of the real text, the receiving the latent representation of the real text and outputting the reconstructed softmax representation of the real text, the receiving the first combination, the receiving the second combination, the outputting the probability, the calculating the generator loss, and the updating the parameters of the parameters of the generator neural network and the parameters of the decoder neural network until the generator loss is minimized.

6. The method of claim 5, further comprising:
determining that the first combination of the reconstructed softmax representation of the real text and the latent representation of the real text and the second combination of the softmax representation of artificial text and the artificial code can be discriminated by the hybrid discriminator neural network; and
repeating the receiving the one-hot representations of the real text, the receiving the artificial code, the receiving the latent representation of the real text, the receiving the first combination of the reconstructed softmax representation of the real text and the latent representation of the real text and the second combination of the softmax representation of artificial text and the artificial code, and the outputting the probability.

7. The method of claim 3,
wherein the reconstruction loss $L_{AE}(\varphi,\psi)$ is minimized based on a formula:

$$\min_{(\varphi,\psi)}(\|x - \mathrm{softmax}(dec_\psi(enc_\varphi(x)))\|^2),$$

wherein x denotes the one-hot representations of the real text, $enc_\varphi$ denotes encoding using the encoder neural network, $dec_\psi$ denotes decoding using the decoder neural network, $\varphi$ denotes parameters of the encoder neural network, and $\psi$ denotes parameters of the decoder neural network.

8. The method of claim 4,
wherein the discriminator loss $L_{critic-ALI}$ is minimized based on a formula:

$$\min_{(w,\varphi,\psi)}\Big(-E_{(\tilde{x},c)\sim P_{\tilde{x}},P_c}[f_w^{t+c}(\tilde{x},c)] + E_{(\hat{x},\hat{c})\sim P_{\hat{x}},P_{\hat{c}}}[f_w^{t+c}(\hat{x},\hat{c})] +$$
$$\lambda E_{(\overline{x},\overline{c})\sim P_{\overline{x}},P_{\overline{c}}}\big[(\|\nabla_{(\overline{x},\overline{c})}f_w^{t+c}(\overline{x},\overline{c})\|_2 - 1)^2\big]\Big),$$

wherein $\tilde{x}$ denotes the reconstructed softmax representation of the real text, $\hat{c}$ denotes the artificial code, $\hat{x}$ denotes the softmax representation of artificial text, c denotes the latent representation of the real text, $\overline{x}$ denotes random samples obtained by sampling uniformly along a line connecting pairs of the softmax representation of the artificial text generated from the artificial code at the decoder neural network and the real text, $\overline{c}$ denotes random latent code samples obtained by sampling uniformly along a line connecting pairs of the artificial code and the latent representation of the real text, $\lambda$ denotes a gradient penalty coefficient, $f_w^{t+c}$ denotes determining the probability using the hybrid discriminator neural network, w denotes parameters of the hybrid discriminator neural network, $\varphi$ denotes parameters of the encoder neural network, and $\psi$ denotes parameters of the decoder neural network.

9. The method of claim 5,
wherein the generator loss $L_{Gen-ALI}$ is minimized based on a formula:

$$\min_{(\theta,\psi)}\Big(-E_{(\hat{x},\hat{c})\sim P_{\hat{x}},P_{\hat{c}}}[f_w^{t+c}(\hat{x},\hat{c})] + E_{(\tilde{x},c)\sim P_{\tilde{x}},P_c}[f_w^{t+c}(\tilde{x},c)]\Big),$$

wherein $\hat{x}$ denotes the softmax representation of artificial text, c denotes the latent representation of the real text, $\tilde{x}$ denotes the softmax representation of the real text, $\hat{c}$ denotes the artificial code, $\theta$ denotes parameters of the generator neural network, $f_w^{t+c}$ denotes determining the probability using the hybrid discriminator neural network, w denotes parameters of the hybrid discriminator neural network, and $\psi$ denotes parameters of the decoder neural network.

10. A device for training a latent space and text-based generative adversarial network (GAN), the device comprising:
one or more processing units; and
a non-transitory computer readable storage medium storing programming for execution by the one or more processing units, the programming including instructions that, when executed by the one or more processing units, cause the device to perform operations including:
receiving, at an encoder neural network of the latent space and text-based GAN, one-hot representations of real text and outputting, by the encoder neural network, a latent representation of the real text generated by the encoder neural network from the one-hot representations of the real text, wherein the real text comprises a sequence of words from a K-word natural language dictionary, and wherein the one-hot representations of the real text include a one-hot representation for each word in the sequence of words from the K-word natural language dictionary;

receiving, at a decoder neural network, the latent representation of the real text output by the encoder neural network, and outputting, by the decoder neural network, a reconstructed softmax representation of the real text generated by the decoder neural network from the latent representation of the real text, wherein the reconstructed softmax representation of the real text is a continuous representation of the real text;

receiving, at the decoder neural network, an artificial code generated by a generator neural network of the GAN from random noise data, and outputting, by the decoder neural network, softmax representation of artificial text generated by the decoder neural network from the artificial code;

receiving, at a hybrid discriminator neural network, a first combination of the reconstructed softmax representation of the real text output by the decoder neural network and the latent representation of the real text output by the encoder neural network;

receiving, at the hybrid discriminator neural network, a second combination of the softmax representation of artificial text and the artificial code; and outputting, by the hybrid discriminator neural network, a probability indicating whether the second combination of the softmax representation of artificial text and the artificial code received by the hybrid discriminator neural network is similar to the first combination of the reconstructed softmax representation of the real text and the latent representation of the real text.

11. The method of claim 1, wherein the continuous representation of the real text is a K-dimensional vector of real numbers in which each entry of the K-dimensional vector is a corresponding probability and maps to a corresponding word in the K-word natural language dictionary.

12. The device of claim 10, wherein the first combination of the reconstructed softmax representation of the real text and the latent representation of the real text comprises a first concatenation of the reconstructed softmax representation of the real text and the latent representation of the real text, and the second combination of the softmax representation of artificial text and the artificial code comprises a second concatenation of the softmax representation of artificial text and the artificial code.

13. The device of claim 10, the operations further comprising:

calculating a reconstruction loss based on a difference between the one-hot representations of the real text and the reconstructed softmax representation of the real text output from the decoder neural network;

updating parameters of the encoder neural network and parameters of the decoder neural network based on the reconstruction loss; and repeating the receiving the one-hot representations of the real text and outputting the latent representation of the real text, the receiving the latent representation of the real text and outputting the reconstructed softmax representation of the real text, the receiving the first combination, the receiving the second combination, the outputting the probability, the calculating the reconstruction loss, and the updating the parameters of the encoder neural network and the parameters of the decoder neural network until the reconstruction loss is minimized.

14. The device of claim 10, the operations further comprising:

calculating a discriminator loss based on the reconstructed softmax representation of the real text, the artificial code, the softmax representation of artificial text, and the latent representation of the real text;

updating parameters of the hybrid discriminator neural network, parameters of the encoder neural network, and parameters of the decoder neural network based on the discriminator loss; and repeating the receiving the one-hot representations of the real text and outputting the latent representation of the real text, the receiving the latent representation of the real text and outputting the reconstructed softmax representation of the real text, the receiving the first combination, the receiving the second combination, the outputting the probability, the calculating the discriminator loss, and updating the parameters of the hybrid discriminator neural network, the parameters of the encoder neural network, and the parameters of the decoder neural network until the discriminator loss is minimized.

15. The device of claim 10, the operations further comprising:

calculating a generator loss that maximizes the probability output by the hybrid discriminator neural network based on a concatenation of the softmax representation of artificial text and the artificial code;

updating parameters of the generator neural network and parameters of the decoder neural network based on the generator loss; and repeating the receiving the one-hot representations of the real text and outputting the latent representation of the real text, the receiving the latent representation of the real text and outputting the reconstructed softmax representation of the real text, the receiving the first combination, the receiving the second combination, the outputting the probability, the calculating the generator loss, and the updating the parameters of the parameters of the generator neural network and the parameters of the decoder neural network until the generator loss is minimized.

16. The device of claim 15, the operations further comprising:

determining that the first combination of the reconstructed softmax representation of the real text and the latent representation of the real text and the second combination of the softmax representation of artificial text and the artificial code can be discriminated by the hybrid discriminator neural network; and repeating the receiving the one-hot representations of the real text, the receiving the artificial code, the receiving the latent representation of the real text, the receiving the first combination of the reconstructed softmax representation of the real text and the latent representation of the real text and the second combination of the softmax representation of artificial text and the artificial code, and the outputting the probability.

17. The device of claim 13,
wherein the reconstruction loss $L_{AE}(\varphi,\psi)$ is minimized based on a formula:

$$\min_{(\varphi,\psi)}(\|x - \text{softmax}(dec_\psi(enc_\varphi(x)))\|^2),$$

wherein x denotes the one-hot representations of the real text, $enc_\varphi$ denotes encoding using the encoder neural network, $dec_\psi$ denotes decoding using the decoder neural network, $\varphi$ denotes parameters of the encoder neural network, and $\psi$ denotes parameters of the decoder neural network.

18. The device of claim 14,
wherein the discriminator loss $L_{critic-ALI}$ is minimized based on a formula:

$$\min_{(w,\varphi,\psi)}\left(-E_{(\tilde{x},c)\sim P_{\tilde{x}},P_c}[f_w^{t+c}(\tilde{x}, c)] + E_{(\hat{x},\hat{c})\sim P_{\hat{x}},P_{\hat{c}}}[f_w^{t+c}(\hat{x}, \hat{c})] +$$
$$\lambda E_{(\overline{x},\overline{c})\sim P_{\overline{x}},P_{\overline{c}}}[(\|\nabla_{(\overline{x},\overline{c})}f_w^{t+c}(\overline{x}, \overline{c})\|_2 - 1)^2]\right),$$

wherein $\tilde{x}$ denotes the reconstructed softmax representation of the real text, $\hat{c}$ denotes the artificial code, $\hat{x}$ denotes the softmax representation of artificial text, c denotes the latent representation of the real text, $\overline{x}$ denotes random samples obtained by sampling uniformly along a line connecting pairs of the softmax representation of the artificial text generated from the artificial code at the decoder neural network and the real text, $\overline{c}$ denotes random latent code samples obtained by sampling uniformly along a line connecting pairs of the artificial code and the latent representation of the real text, $\lambda$ denotes a gradient penalty coefficient, $f_w^{t+c}$ denotes determining the probability using the hybrid discriminator neural network, w denotes parameters of the hybrid discriminator neural network, $\varphi$ denotes parameters of the encoder neural network, and $\psi$ denotes parameters of the decoder neural network.

19. The device of claim 15,
wherein the generator loss $L_{Gen-ALI}$ is minimized based on a formula:

$$\min_{(\theta,\psi)}\left(-E_{(\hat{x},\hat{c})\sim P_{\hat{x}},P_{\hat{c}}}[f_w^{t+c}(\hat{x}, \hat{c})] + E_{(\tilde{x},c)\sim P_{\tilde{x}},P_c}[f_w^{t+c}(\tilde{x}, c)]\right),$$

wherein $\hat{x}$ denotes the softmax representation of artificial text, c denotes the latent representation of the real text, $\tilde{x}$ denotes the softmax representation of the real text, $\hat{c}$ denotes the artificial code, $\theta$ denotes parameters of the generator neural network, $f_w^{t+c}$ denotes determining the probability using the hybrid discriminator neural network, w denotes parameters of the hybrid discriminator neural network, and $\psi$ denotes parameters of the decoder neural network.

20. The device of claim 10, wherein the continuous representation of the real text is a K-dimensional vector of real numbers in which each entry of the K-dimensional vector is a corresponding probability and maps to a corresponding word in the K-word natural language dictionary.

21. A non-transitory computer-readable medium having instructions stored thereon that, when executed by a device, cause the device to perform operations for training a latent space and text-based generative adversarial network (GAN), the operations comprising:
receiving, at an encoder neural network of the latent space and text-based GAN, one-hot representations of real text and outputting, by the encoder neural network, a latent representation of the real text generated by the encoder neural network from the one-hot representations of the real text, wherein the real text comprises a sequence of words from a K-word natural language dictionary, and wherein the one-hot representations of the real text include a one-hot representation for each word in the sequence of words from the K-word natural language dictionary;
receiving, at a decoder neural network of the latent space and text-based GAN, the latent representation of the real text generated from the one-hot representations of the real text, and outputting, by the decoder neural network, a reconstructed softmax representation of the real text generated by the decoder neural network from the latent representation of the real text, wherein the reconstructed softmax representation of the real text is a continuous representation of the real text;
receiving, at the decoder neural network, an artificial code generated by a generator neural network of the latent space and text-based GAN from random noise data, and outputting, by the decoder neural network, softmax representation of artificial text generated by the decoder neural network from the artificial code;
receiving, at a hybrid discriminator neural network of the latent space and text-based GAN, a first combination of the reconstructed softmax representation of the real text output by the decoder neural network and the latent representation of the real text output by the encoder neural network;
receiving, at the hybrid discriminator neural network, a second combination of the softmax representation of artificial text and the artificial code; and
outputting, by the hybrid discriminator neural network, a probability indicating whether the second combination of the softmax representation of artificial text and the artificial code received by the hybrid discriminator neural network is similar to the first combination of the reconstructed softmax representation of the real text and the latent representation of the real text received by the hybrid discriminator neural network.

22. The non-transitory computer-readable medium of claim 21, wherein the first combination of the reconstructed softmax representation of the real text and the latent representation of the real text comprises a first concatenation of the reconstructed softmax representation of the real text and the latent representation of the real text, and the second combination of the softmax representation of artificial text and the artificial code comprises a second concatenation of the softmax representation of artificial text and the artificial code.

* * * * *

UNITED STATES PATENT AND TRADEMARK OFFICE
CERTIFICATE OF CORRECTION

PATENT NO. : 11,663,483 B2
APPLICATION NO. : 16/175373
DATED : May 30, 2023
INVENTOR(S) : Haidar et al.

Page 1 of 1

It is certified that error appears in the above-identified patent and that said Letters Patent is hereby corrected as shown below:

In the Claims

In Column 27, in Claim 5, Line 41, delete "parameters of the parameters" and insert -- parameters --, therefor.

In Column 30, in Claim 15, Line 47, delete "parameters of the parameters" and insert -- parameters --, therefor.

Signed and Sealed this
Eighth Day of August, 2023

Katherine Kelly Vidal
*Director of the United States Patent and Trademark Office*